(12) United States Patent
Bahirji et al.

(10) Patent No.: US 10,733,108 B2
(45) Date of Patent: Aug. 4, 2020

(54) PHYSICAL PAGE TRACKING FOR HANDLING OVERCOMMITTED MEMORY

(71) Applicant: Intel Corporation, Santa Clara, CA (US)

(72) Inventors: Vijay Bahirji, Hillsboro, OR (US); Amin Firoozshahian, Mountain View, CA (US); Mahesh Madhav, Portland, OR (US); Toby Opferman, Beaverton, OR (US); Omid Azizi, Redwood City, CA (US)

(73) Assignee: Intel Corporation, Santa Clara, CA (US)

( * ) Notice: Subject to any disclaimer, the term of this patent is extended or adjusted under 35 U.S.C. 154(b) by 252 days.

(21) Appl. No.: 15/980,523

(22) Filed: May 15, 2018

(65) Prior Publication Data

US 2019/0354487 A1    Nov. 21, 2019

(51) Int. Cl.
*G06F 12/00* (2006.01)
*G06F 12/1009* (2016.01)
*G06F 12/02* (2006.01)

(52) U.S. Cl.
CPC ...... *G06F 12/1009* (2013.01); *G06F 12/0223* (2013.01); *G06F 12/0246* (2013.01); *G06F 2212/1044* (2013.01); *G06F 2212/401* (2013.01)

(58) Field of Classification Search
CPC .............. G06F 12/023; G06F 12/1009; G06F 2212/1044; G06F 2212/401
See application file for complete search history.

(56) References Cited

U.S. PATENT DOCUMENTS

| | | | |
|---|---|---|---|
| 2015/0058576 A1* | 2/2015 | Galbraith | G06F 12/0886 711/133 |
| 2016/0266923 A1* | 9/2016 | Miyoshi | G06F 9/45558 |
| 2018/0210656 A1* | 7/2018 | Sato | G06F 3/0605 |

* cited by examiner

*Primary Examiner* — Reginald G Bragdon
*Assistant Examiner* — Edward Wang
(74) *Attorney, Agent, or Firm* — Schwegman Kundberg & Woessner, P.A.

(57) ABSTRACT

A system for computer memory management that implements a memory pool table, the memory pool table including entries that describe a plurality of memory pools, each memory pool representing a group of memory pages related by common attributes; a per-page tracking table, each entry in the per-page tracking table used to related a memory page with a memory pool of the memory pool table; and processing circuitry to: scan each entry in the per-page tracking table and, for each entry: determine an amount of memory released if the memory page related with the entry is swapped; aggregate the amount of memory for the respective memory pool related with the memory page related with the entry in the per-page tracking table, to produce a per-pool memory aggregate; and output the per-pool memory aggregate for the memory pools related with the memory pages in the per-page tracking table.

20 Claims, 23 Drawing Sheets

| BIT LOCATION | ATTRIBUTE | ZERO | ONE |
|---|---|---|---|
| 0 | USER OR KERNEL | KERNEL | USER |
| 1 | SHARED OR NOT | SHARED | NOT SHARED |
| 2 | STANDBY OR ACTIVE | ACTIVE | STANDBY |
| 3 | PAGED OR NOT PAGED | NOT PAGED | PAGED |

*FIG. 4*

| PAGE INDEX | MEMORY POOL INDEX | PAGE ATTRIBUTES |
|---|---|---|
| PG_INDEX_1 | MEM_POOL_INDEX_1 | 0 |
| PG_INDEX_1 | MEM_POOL_INDEX_5 | 1 |
| PG_INDEX_3 | MEM_POOL_INDEX_4 | 1 |
| PG_INDEX_1 | MEM_POOL_INDEX_1 | 0 |

*FIG. 6*

| PAGED | STANDBY | NOT SHARED | USER | RANK VALUE | DESCRIPTION |
|---|---|---|---|---|---|
| YES | YES | YES | YES | 15 | STANDBY PAGE |
| YES | NO | YES | YES | 11 | USER NOT SHARED |
| YES | NO | NO | YES | 9 | USER SHARED |
| YES | NO | YES | NO | 10 | KERNEL NOT SHARED |
| YES | NO | NO | NO | 8 | KERNEL SHARED |
| YES | YES | NO | NO | 12 | INVALID |
| YES | YES | YES | YES | 13 | INVALID |
| YES | YES | YES | NO | 14 | INVALID |
| NO | YES | NO | NO | 6 | INVALID |
| NO | YES | YES | YES | 7 | INVALID |
| NO | YES | YES | NO | 5 | INVALID |
| NO | YES | NO | YES | 4 | INVALID |
| NO | NO | NO | YES | 1 | NOT PAGED SHARED USER |
| NO | NO | YES | YES | 3 | NOT PAGED NOT SHARED USER |
| NO | NO | NO | NO | 0 | NOT PAGED SHARED KERNEL |
| NO | NO | YES | NO | 2 | NOT PAGED NOT SHARED KERNEL |

```
FUNCTION GET_MEMPOOL_TO_RELINQUISH (POOL_PRIORITY_TH)
{
MAX_POOLS = READ_MEMPOOL_ENTRYSIZE();

FOR I = 0 TO MAX_POOLS
    COUNTER[I] = 0;

FOR EACH ENTRY IN PER-PAGE_TRACKING_TABLE
{
    P = ENTRY.POOL_INDEX;

PRIORITY = GET_POOL_PRIORITY (P);

IF PRIORITY > POOL_PRIORITY_TH {
        IF NOT ENTRY.LOCKED {
            M = COMPUTE_MEMORY_RELEASED (ENTRY);
            COUNTER[ENTRY.POOL_INDEX] += M;
        }
    }
}

SORT (COUNTER);

RETURN COUNTER;
}
```

*FIG. 9*

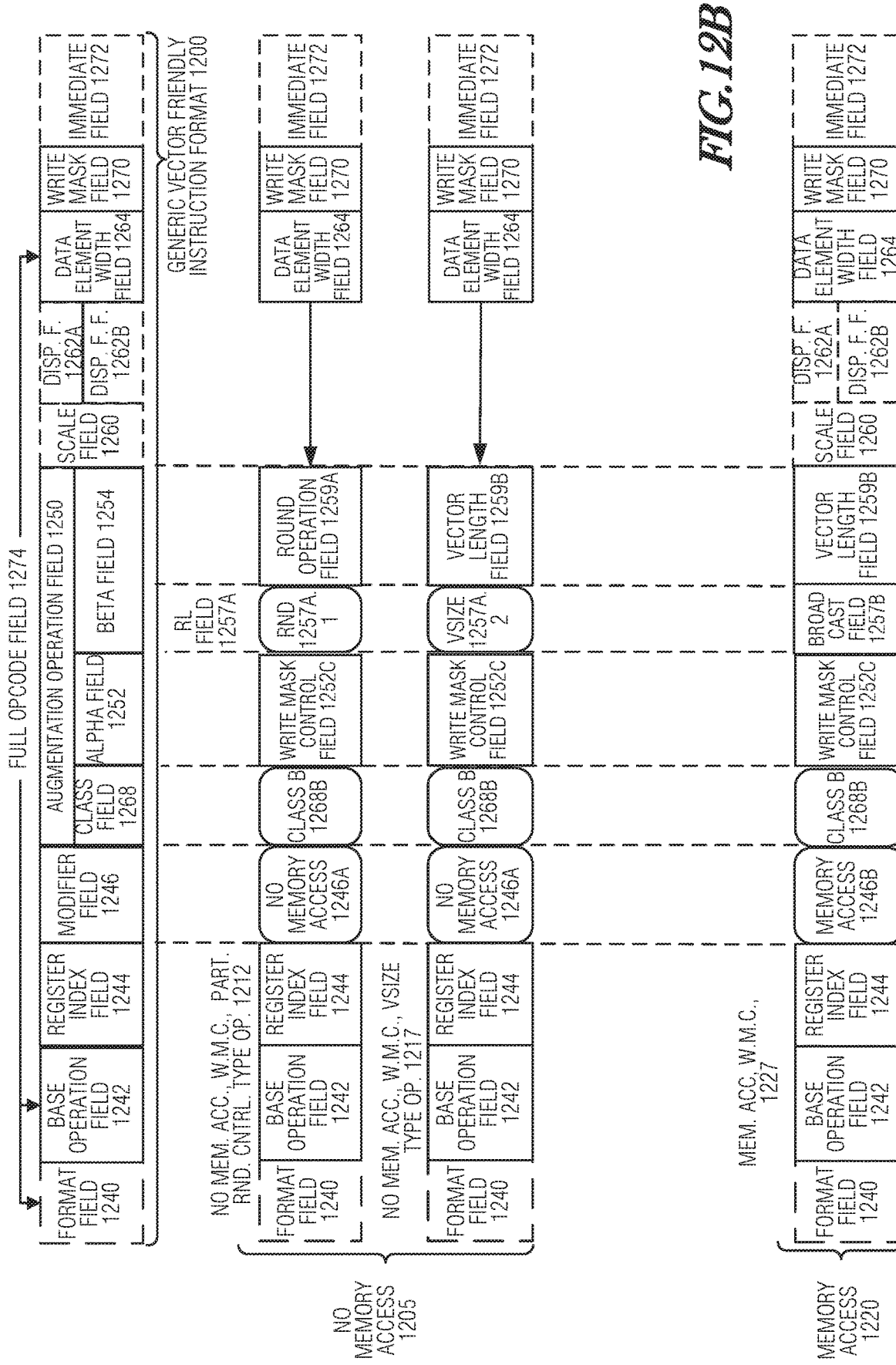

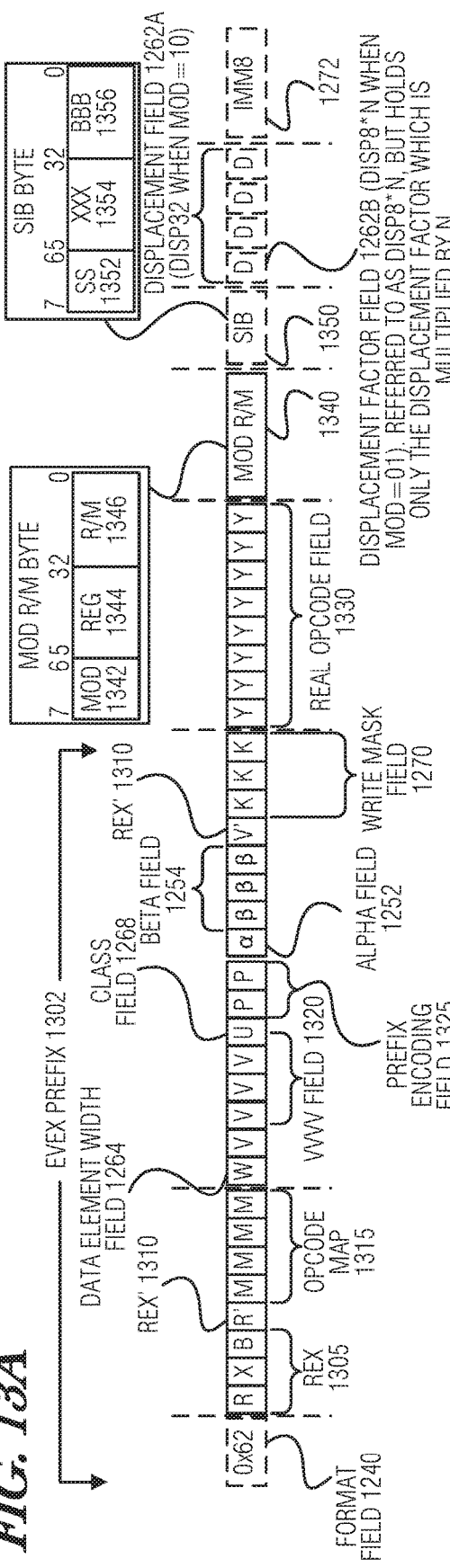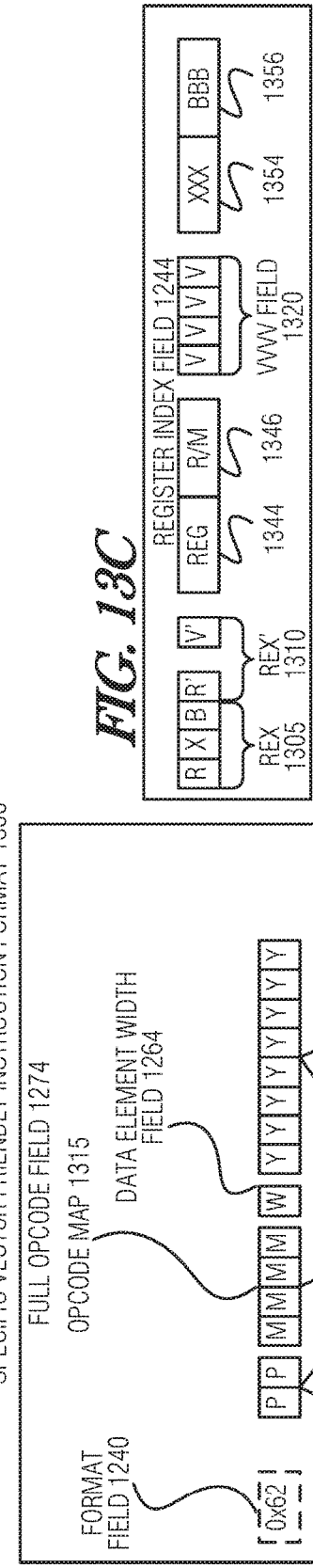

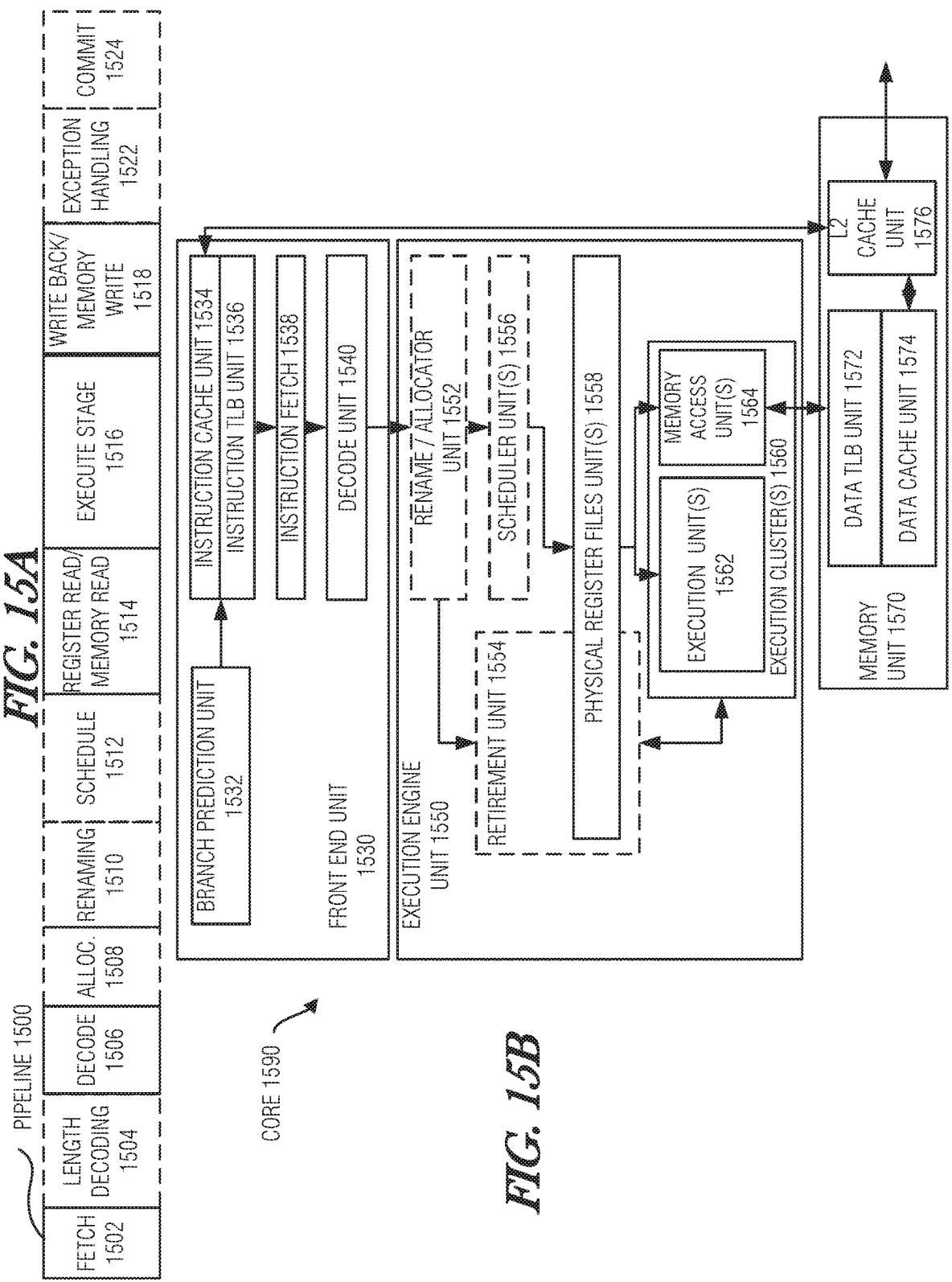

PHYSICAL PAGE TRACKING FOR HANDLING OVERCOMMITTED MEMORY

TECHNICAL FIELD

Embodiments described herein generally relate to computer memory management, and in particular to systems and methods for using physical page tracking to facilitate deduplicated memory overcommit handling.

BACKGROUND

Modern computing systems use an ever increasing amount of memory for operating systems, applications, and data. For efficient use of memory, various memory reduction techniques have been developed. Some memory reduction techniques aim to reduce the amount of memory used by using data compression techniques on the memory contents. Other memory reduction techniques eliminate duplicate copies of data in memory and use references to point to a single copy of the data, such as with memory deduplication techniques. In either case, more addressable memory space is advertised than the actual physical memory available.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 4 is a table illustrating memory pool attributes, according to an embodiment;

FIG. 5 is a table illustrating pool prioritization, according to an embodiment;

FIG. 6 is a table illustrating a per-page tracking table, according to an embodiment:

FIG. 9 is a pseudocode listing illustrating a process to gather compaction information, according to an embodiment;

FIGS. 12A-12B are block diagrams illustrating a generic vector friendly instruction format and instruction templates thereof according to an embodiment;

FIGS. 13A-13D are block diagrams illustrating a specific vector friendly instruction format according to an embodiment;

FIG. 15A is a block diagram illustrating both an in-order pipeline and a register renaming, out-of-order issue/execution pipeline according to an embodiment;

FIG. 15B is a block diagram illustrating both an in-order architecture core and a register renaming, out-of-order issue/execution architecture core to be included in a processor according to an embodiment;

DETAILED DESCRIPTION

Figure 1:
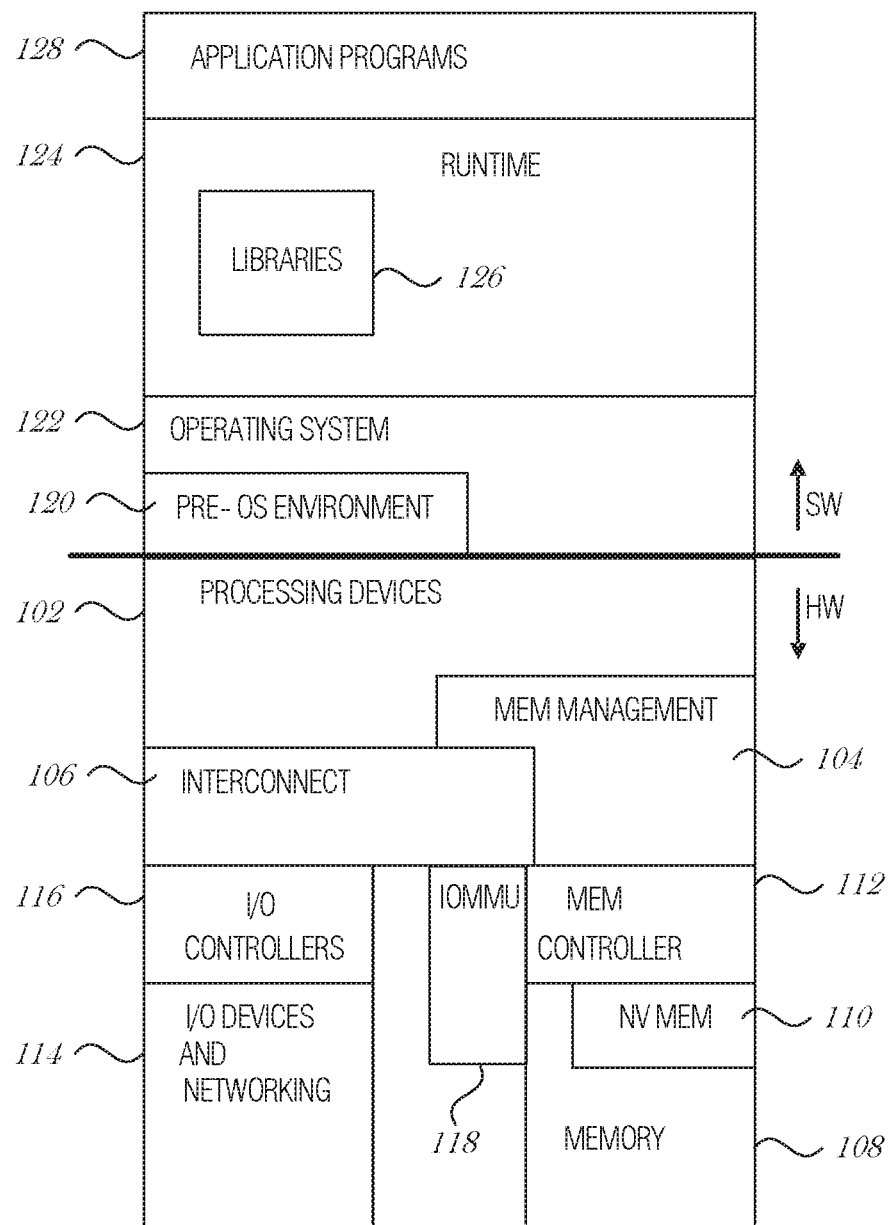
FIG. 1 is a diagram illustrating hardware and software architecture 100 of a computing system, in which various interfaces between hardware components and software components are shown, according to an embodiment.

In the following description, for purposes of explanation, numerous specific details are set forth in order to provide a thorough understanding of some example embodiments. It will be evident, however, to one skilled in the art that the present disclosure may be practiced without these specific details.

Use of memory reduction techniques allow a memory consumer (e.g., an application, an operating system, a process, etc.) to address more memory than is actually available at the physical level. In other words, memory address space is decoupled from memory data space. For instance, an 8 gigabyte (GB) memory device may be advertised as having 12 GB of storage space available. When applications allocate memory in the memory device, some of the applications' data is compressed so that from the applications' point-of-view, there is 12 GB of addressable space (e.g., address space) that indirect into 8 GB of physical memory space (e.g., data space).

In an example, a system may use a memory reduction technique referred to as deduplication. Memory deduplication is a process for efficient memory use. Instead of storing multiple copies of the same data, one deduplicated copy is stored and additional data structures are used to track which processes may use the same "deduplicated" data. Memory deduplication is performed in hardware and may be a part of the memory controller. By deduplicating data, a memory controller may advertise more address space than there is data space.

Another example of memory reduction is a system that uses compression technology to compress contents of the physical memory and hence use memory more efficiently. In such a system when the central processing unit (CPU) writes a block of memory, for example a 4 kilobyte (KB) page, actual physical memory consumption may be much less than 4 KB if the contents of the page are compressed, hence allowing the physical memory to accommodate more contents than the original size of the block that was written.

The difference between the address space (e.g., addressable space) and the data space is determined by the amount of compression (e.g., compression ratio) the data undergoes. Based on various implementations, the compression ratio may be as high as 2:1, 2.5:1, or even higher, of address space to data space.

In such systems, the actual physical memory consumption may vary over time as data contents may have different compression ratios over the course of program execution. Decoupling of the address space from data space prevents system software from being aware of how much physical memory is actually consumed in the system. As a result, this indirection prevents system software from taking necessary actions in cases where physical memory is approaching its limit. Traditionally when the system software manages all physical memory, it is aware of the memory consumption and may start freeing space by swapping out to other forms of storage.

"Memory pressure" or "memory oversubscription" is a condition where physical memory consumption of the data space is approaching its limits (e.g., getting full) and the advertised address space is overcommitted. In such a situation, the system software may continue to attempt to allocate memory, its metrics erroneously indicating that there is underlying data space available, when in reality, the data space is at or near capacity. Attempts to write to a completely full physical memory space may result in data loss, memory errors, crashes, or other error states.

In an overcommitted memory system (e.g., a memory system using compression or deduplication with a high memory usage), the amount of memory available for use by software varies with the content that is written into memory. In such a system, software may cause the system to run out of usable memory simply by overwriting the contents of already allocated memory pages with less compressible content. The operating system (OS) is expected to deal with this memory pressure by swapping out memory to disk.

In a memory compression scheme, the data stored in memory is first compressed using some compression algorithm, and then decompressed on the fly when the memory location is later accessed. By storing the data in a compressed form, the amount of usable memory is increased. Deduplication, in comparison, uses a scheme where identical chunks of data are reduced to fewer chunks, or deduplicated, so that fewer copies of the identical chunks are stored. Pointers and other mechanisms are used to mask the deduplication scheme from the owner process or thread.

When a fully compressed or deduplicated page is swapped out, due to the variance of compression page-to-page, some amount of physical memory is returned to the system. However, when swapping out a fully deduplicated page that shares all of its contents with other pages, there is no physical memory returned to the system. What is needed is a mechanism to better manage paging in a deduplicated memory system that identify what pages return the most amount of memory back to the system when swapped. Implementation of such a mechanism increases the operational efficiency and ability of the compute system through better memory management. The implementations discussed herein improve the operation of a compute device at a fundamental level of memory management.

This disclosure describes an innovative approach to improve the operation of a computing system by using a page tracking scheme. The page tracking scheme may be implemented in hardware and accessible from a software stack, such as through drivers, OS libraries, or the like. The page tracking scheme described herein provides an application programming interface (API) to dynamically select a page to relinquish in order to reduce memory pressure. The API works in tandem with hardware to address memory overcommitment.

FIG. 1 is a diagram illustrating hardware and software architecture 100 of a computing system, in which various interfaces between hardware components and software components are shown, according to an embodiment. As indicated by HW, hardware components are represented below the divider line, whereas software components (denoted by SW) reside above the divider line. On the hardware side, processing devices 102 (which may include one or more microprocessors, digital signal processors, etc., each having one or more processor cores, are interfaced with memory management device 104 and system interconnect 106. Memory management device 104 provides mappings between virtual memory used by processes being executed, and the physical memory. Memory management device 104 may be an integral part of a central processing unit which also includes the processing devices 102.

Interconnect 106 includes a backplane such as memory, data, and control lines, as well as the interface with input/output devices. e.g., PCI, USB, etc. Memory 108 (e.g., dynamic random access memory—DRAM) and non-volatile memory 110 such as flash memory (e.g., electrically-erasable read-only memory—EEPROM, NAND Flash. NOR Flash, etc.) are interfaced with memory management device 104 and interconnect 106 via memory controller 112. This architecture microarchitecture 100 may support direct memory access (DMA) by peripherals in some embodiments. I/O devices, including video and audio adapters, non-volatile storage, external peripheral links such as USB. Bluetooth, etc., as well as network interface devices such as those communicating via Wi-Fi or LTE-family interfaces, are collectively represented as I/O devices and networking 114, which interface with interconnect 106 via corresponding I/O controllers 116.

In a related embodiment, input/output memory management unit IOMMU 118 supports secure direct memory access (DMA) by peripherals. IOMMU 118 may provide memory protection by mediating access to memory 108 from I/O device 114. IOMMU 118 may also provide DMA memory protection in virtualized environments, where it allows certain hardware resources to be assigned to certain guest VMs running on the system, and enforces isolation between other VMs and peripherals not assigned to them.

On the software side, a pre-operating system (pre-OS) environment 120, which is executed at initial system start-up and is responsible for initiating the boot-up of the operating system. One traditional example of pre-OS environment 120 is a system basic input/output system (BIOS). In present-day systems, a unified extensible firmware interface (UEFI) may be implemented. Pre-OS environment 120, is responsible for initiating the launching of the operating system, but also provides an execution environment for embedded applications.

Operating system (OS) 122 provides one or more kernels that control the hardware devices, manages memory access for programs in memory, coordinates tasks and facilitates multi-tasking, organizes data to be stored, assigns memory space and other resources, loads program binary code into memory, initiates execution of the application program which then interacts with the user and with hardware devices, and detects and responds to various defined interrupts. Also, operating system 122 provides device drivers, and a variety of common services such as those that facilitate interfacing with peripherals and networking, that provide abstraction for application programs so that the applications do not need to be responsible for handling the details of such common operations. Operating system 122 additionally provides a graphical user interface (GUI) that facilitates interaction with the user via peripheral devices such as a monitor, keyboard, mouse, microphone, video camera, touchscreen, and the like.

Runtime system 124 implements portions of an execution model, including such operations as putting parameters onto the stack before a function call, the behavior of disk input/output (I/O), and parallel execution-related behaviors. Runtime system 124 may also perform support services such as type checking, debugging, or code generation and optimization.

Libraries 126 include collections of program functions that provide further abstraction for application programs. These include shared libraries, dynamic linked libraries (DLLs), for example. Libraries 126 may be integral to the operating system 122, runtime system 124, or may be added-on features, or even remotely-hosted. Libraries 126 define an application program interface (API) through which a variety of function calls may be made by application programs 128 to invoke the services provided by the operating system 122. Application programs 128 are those programs that perform useful tasks for users, beyond the tasks performed by lower-level system programs that coordinate the basic operability of the computing device itself.

Figure 2:
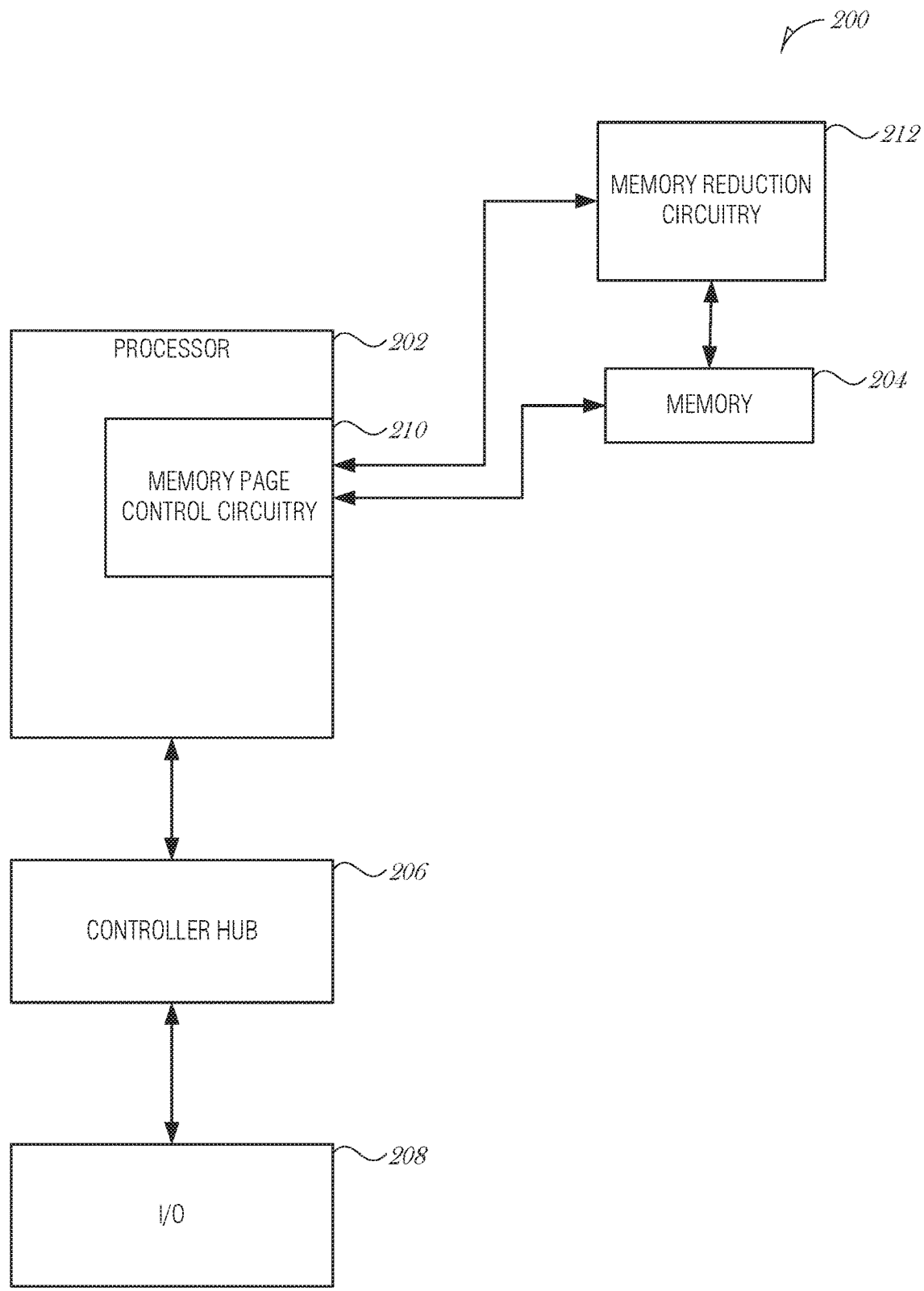
FIG. 2 is a block diagram illustrating a system, according to an embodiment.

FIG. 2 is a block diagram illustrating a system 200, according to an embodiment. The system 200 includes a processor 202, a memory device 204, a controller hub 206, and input/output (I/O) devices 208. While only one processor 202 is illustrated in FIG. 2, it is understood that one or more processors 202 may be included in the system 200.

The processor 202 is coupled to the controller hub 206 to pass control signals and data to I/O devices 208. The controller hub 206 may include sub-controllers, such as a graphics memory controller hub (GMCH) or an I/O hub (IOH), which may be on separate chips. The controller hub 206 communicates with the processor 202 via a multi-drop bus, such as a frontside bus (FSB), point-to-point interface such as QuickPath Interconnect (QPI), or similar connection. In various embodiments, the controller hub 206 may be an instance of controller hub 1920 of FIG. 19.

The memory device 204 is coupled directly to the processor 202. The memory device 204 may be, for example, dynamic random access memory (DRAM), phase change memory (PCM), or a combination of the two. The memory device 204 may be an instance of main memory 1204 of FIG. 12, or memory 1940 of FIG. 19, for example.

The system 200 also includes a memory page control circuitry 210, which may be integrated into a memory controller in the processor 202, or may be a separate unit. For instance, the memory page control circuitry 210 may be a coprocessor or other special-purpose processor (e.g., memory management device 104 of FIG. 1, graphics memory controller hub 1990 of FIG. 19, or integrated memory controller 2072 of FIG. 20).

Memory reduction circuitry 212 is used to compress or deduplicate data in the memory device 204. The memory reduction circuitry 212 may be incorporated into the memory page control circuitry 210 or may be a separate special-purpose circuitry for memory reduction techniques.

The memory page control circuitry 210 is used to monitor each page in memory device 204. The operating system (OS) may communicate with the memory page control circuitry 210 to obtain assistance in determining which page to relinquish to relieve memory pressure. The OS may provide the memory page control circuitry 210 information to select the physical pages that may be quickly relinquished. The memory page control circuitry 210 and OS track non-contiguous pages of physical memory as groups sharing multiple attributes. The OS defines the attributes and the memory page control circuitry 210 tracks them using a shared index. The OS may use the index to determine where to swap physical addresses from and the memory page control circuitry 210 may use the attributes to select the best physical pages to swap.

Compared to traditional systems where system software is used to manage the physical memory, in a deduplicated memory system or a system that uses memory compression, the actual physical memory consumption is only known to the hardware. The architecture described here implements an improved page swapping mechanism by identifying the pages that provide the most benefit if swapped to secondary storage.

Figure 3:
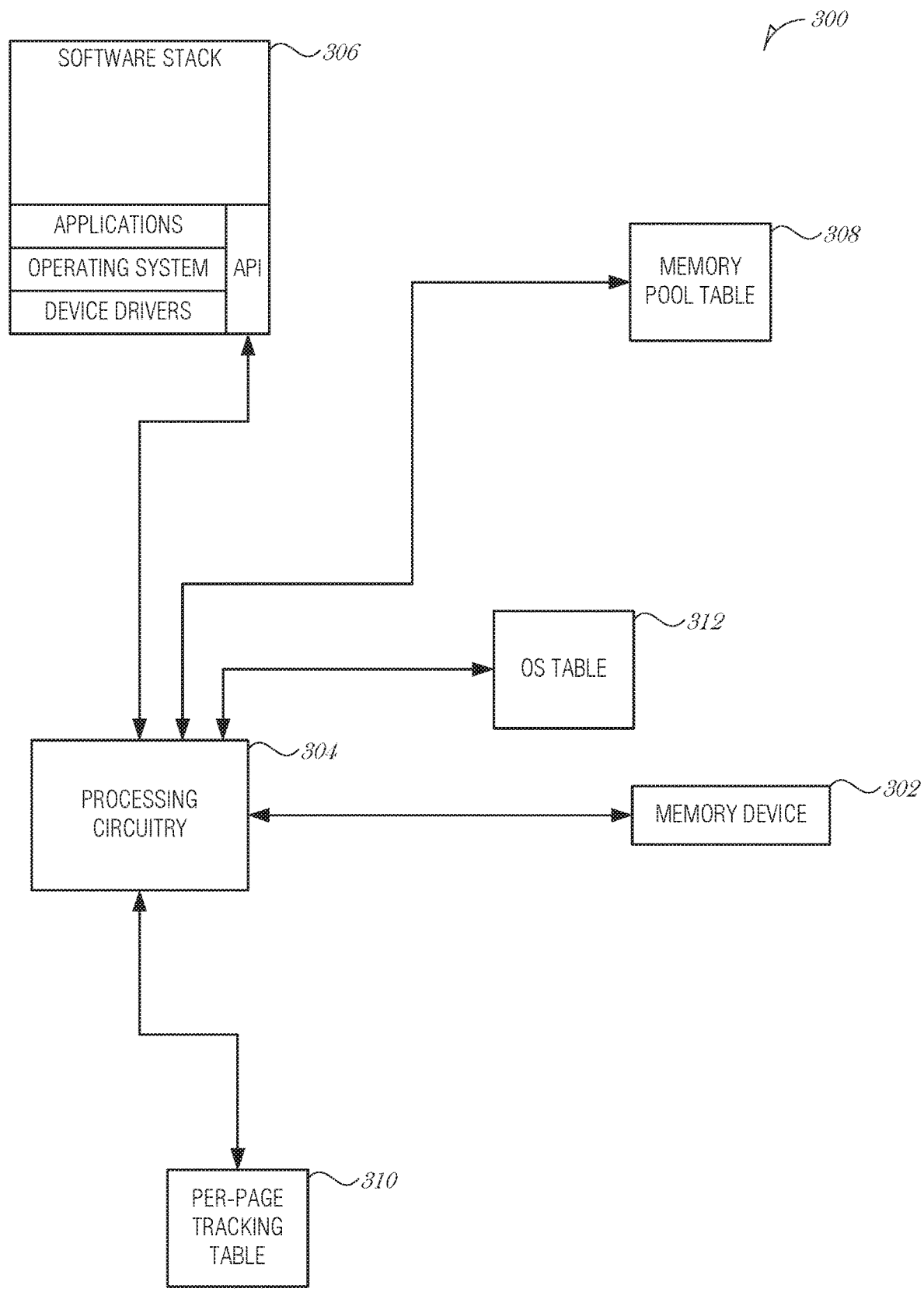
FIG. 3 is a block diagram illustrating a memory management system, according to an embodiment.

FIG. 3 is a block diagram illustrating a memory management system 300, according to an embodiment. The memory management system 300 includes a memory device 302, processing circuitry 304, and a software stack 306, which includes operating system. The memory device 302 may include one or more devices used to store data. Examples of memory device 302 include volatile or non-volatile memory, such as memory 108 of FIG. 1, memory device 204 of FIG. 2, or memory 2032 of FIG. 23, for example.

Processing circuitry 304 may include a memory controller, general CPU, or other specialized circuitry. The processing circuitry 304 may be configured as a single die or package or may include several dies across several packages.

In operation, memory usage of the memory device 302 is tracked by the processing circuitry 304 using several data structures. A "memory pool" is a group of physical pages of the memory device 302. A memory pool may include non-contiguous groups of physical addresses. Each memory pool has attributes associated with all physical pages in the pool. Memory pools may be formed to group image code, image data, process heap, non-paged pool, paged pool, page tables, and thread stacks, according to an embodiment. It is understood that more or fewer pools may be used in a given implementation depending on the needs of the implementation. Physical pages within a memory pool may have attributes that are independent from memory pool attributes. For instance, a page may be locked or unlocked.

A memory pool table 308 is used to track each memory pool related with the memory device 302. In an embodiment, the memory pool table 308 is maintained as a 16-entry array in hardware, where each entry identifies a unique memory pool by an index value. Each entry (i.e., record) includes memory pool attributes defined by the software stack (e.g., operating system) 306. The software stack (e.g., operating system) 306 may control the association between the memory pool index and the memory pool attributes. Hardware, such as memory device 302 and processing circuitry 304, is not required to know of the association. The memory pool table 308 is used to consolidate the attributes from a large number of pages into one memory pool table 308. The memory pool table 308 may be stored in main memory (e.g., memory device 302), cache memory, in a separate hardware register, or in another memory device, for example.

In an embodiment, an entry in the memory pool table 308 may include the tuple {memory pool index, pool attributes}, where memory pool index is a 4-bit field to index into a total of sixteen possible memory pools, and pool attributes is a 4-bit field to provide a bit value for each of four OS-defined pool attributes. It is understood that more or fewer bits may be used to index into more pools, provide additional attributes, or reduce either of these features.

FIG. 4 is a table 400 illustrating memory pool attributes, according to an embodiment. The table 400 of memory pool attributes are defined by the operating system. Using the bitmap of size four, the four attributes may define whether a pool is a user pool or kernel pool, shared or not, standby or active, and paged or not paged. The bit locations of each of the attributes is provided from least significant bit to most significant bit.

Returning to FIG. 3, the arrangement of the attributes and the bit values used to indicate each state of each attribute allows the pools to be prioritized or ranked. A memory pool table is built using the attributes. This may be part of the OS initialization when the OS defines the pool attributes and writes it to the hardware memory pool table 308. Using ranked pools allows the OS to swap pages out of a pool that provides the most benefit (in terms of memory that is released when a page is swapped out). In general, the more physical memory that pages in a pool may release, the higher the pool's rank.

FIG. 5 is a table 500 illustrating pool prioritization or ranking, according to an embodiment. In the table 500, the rank value is derived by calculating a binary value of the pool attributes based on their location in the bitmask. In the table 500, a "yes" is equated to a "1" value and a "no" is equated to a "0" value. The four attributes defined in memory pool attributes table 400 are listed at the column headers, with the attribute state selected in a way that a "yes" ("1") value indicates a higher possibility of reclaiming memory by relinquishing pages from the pool. When all four attributes have a value of "1" (e.g., the bitmap is "1111"), then the resulting binary value is 15, resulting in the highest possible rank. Some pools are unavailable and cannot be swapped out. Other entries in the table 500 represent invalid combinations. As such, in this example embodiment, pages that are higher rank (e.g., most likely to result in more memory being reclaimed) include the first five entries in the table 500.

Using the attributes, a system implementer may design the pool prioritization or ranking based on the underlying functionality of the memory subsystems. For instance, in the current example, a page that is not shared is easier to release (e.g., to page out to a backing store) than a page that is shared amongst several processes. As such, the not shared attribute is "1" when the page is not shared, and "0" when it is shared. In other implementations, a different attribute may be tracked in the pool ranking scheme such that if the attribute has one state that indicates it would be easier to swap the page to the backing store, then the value is "1" and if the attribute has a different state that makes it more difficult to swap, then the value is "0"—thereby influencing the rank value of the pool.

Returning to FIG. 3, a per-page tracking table 310 is maintained in hardware. The per-page tracking table 310 may be stored in main memory (e.g., memory device 302), cache memory, in a separate hardware register, or in another memory device, for example. The per-page tracking table 310 includes one entry for each physical page. Each entry identifies the memory pool index for the page of that entry. Each entry also includes per-page attributes, which may be used to provide page-level attributes. One page-level attribute is whether the page is in a locked state or not. Pages in a locked state cannot be swapped out, so this state may be used as a filter to reduce the number of candidate pages for swapping. Other page-level attributes may be used to increase processing efficiency when filtering, sorting, or analyzing candidate pages for swapping.

FIG. 6 is a table 600 illustrating a per-page tracking table 310, according to an embodiment. The memory pool index field in each entry is a reference to a memory pool in the memory pool table 308. In the current example implementation, the memory pool index is a 4-bit field to accommodate a maximum of 16 entries in the memory pool table 308. A larger or smaller memory pool index may be used depending on the number of entries and the size of the memory available to store the memory pool table 308.

The per-page tracking table 310 may include the tuple {page index, memory pool index, page attributes}, where page index is a system-wide unique identifier to identify the page, memory pool index is the index to the specific memory pool in the memory pool table 308, and page attributes is a bitmap of page-level attributes, each attribute having at least a binary state. In the current example implementation, the page attributes bitmap is of size 1, with a single bit to indicate whether the page is locked or unlocked. It is understood that other bitmaps may be used, and that two or more bits may be combined to indicate a tri-state, or other multi-state, value of a page attribute.

The memory pool index may be an arbitrarily assigned identifier generated by the operating system or by hardware. Alternatively, the memory pool index value may be the rank value of the memory pool as derived from the memory pool's attributes. In this case, the memory pool index is guaranteed to be unique because the combinations of attributes are unique.

Returning to FIG. 3, the software stack (e.g., operating system) 306 also maintains its own table to track the processes that allocate (or cause the allocation of) the pages that belong to memory pools. Processes may allocate pages that may or may not be shared with other processes. Private pages are not shared. Pages for libraries (e.g., dynamically-loaded libraries) and the like may be allocated to be shared among processes. This information is stored in the OS table 312, which is initialized when the software stack (e.g., operating system) 306 initializes the memory pool entries in hardware. The OS table 312 is used to store a list of processes that allocate pages (e.g., shared images private non-shared pages) that belong to the same memory pool. Each entry in the OS table 312 may be defined with the tuple {memory pool index, page index, process id}. A given process may be listed in multiple memory pool entries when the process owns pages from different pools. The OS table 312 may be stored in main memory (e.g., memory device 302), cache memory, in a separate hardware register, or in another memory device, for example.

A software stack 306 is used to interface with the processing circuitry 304. The software stack 306 may include drivers, libraries, applications, or other software components in an operating system, user application space, or the like. An application programming interface (API) is exposed to components in the software stack 306. The API is used to control the operation of the processing circuitry 304.

The API includes functions to manage the memory pool table 308, the per-page tracking table 310, and interface with the processing circuitry 304 to manage memory pages. It is understood that additional functions may be developed and exposed via the API.

Interfaces to Manage the Memory Pool Table

The memory pool table 308 is populated during platform initialization. Hardware, such as the processing circuitry 304, enumerates the memory pool table 308. The operating system (e.g., software stack 306) defines the memory pool attributes and initializes the values of the memory pool table 308. The number of entries in the memory pool table 308 is derived from the memory pool entry size, which is read from hardware by the software stack 306. An example API function prototype is Read_MemPool_EntrySize ( ), which returns an integer value of the number of pools the hardware is able to track. This may be based on the size of the structure used for the memory pool table 308, the size of each entry in the memory pool table 308, and other aspects of hardware.

The software stack 306 may then use one or more API functions to initialize the memory pool attributes in the memory pool table 308. A Write_MemPoolIndex( ) function is used to write an entry to the memory pool table 308 and a Read_MemPoolIndex( ) function is used to read an entry from the memory pool table 308.

The Write_MemPoolIndex( ) function takes the form Write_MemPoolIndex (Pool_Index, Pool_Attributes), where pool_index is a unique identifier to identify a specific pool, and pool_attributes is a bit string to write to the attribute bitmap. The function returns an indication of success or failure, depending on whether the processing circuitry 304 is able to write to the memory pool table 308 successfully.

The Read_MemPoolIndex( ) function takes the form Read_MemPoolIndex(Pool_Index), where pool_index is a unique identifier to identify a specific pool. The function returns a value representing the bitmap of the attributes. The value may be a binary value, a base-10 value, or some other representation depending on implementation.

Interfaces to Manage the Per-Page Tracking Table

The software stack 306 is used during runtime to allocate and deallocate memory, causing physical pages to move between different pools. With each allocation or deallocation, the operating system uses an API to update the physical page information (e.g., memory pool index and page attributes) in the per-page tracking table 310. The operating system may write to the per-page tracking table 310 using a Write_Page_Attributes( ) function, and read the page attributes with a Read_Page_Attributes( ) function. To update the lock status of a page, lightweight functions may be used such as Lock_Page( ) and Unlock_Page( ). In the example implementation discussed here, the only page-level attribute stored in the per-page tracking table 310 is the page lock status. As such, the Write_Page_Attirbutes( ) function may be used with nearly the same overhead as the Lock_Page( ) or Unlock_Page( ) functions. However, for versatility and breadth of implementations, separate functions are described.

The Write_Page_Attributes( ) function takes the form Write_Page_Attributes(PageFrameNumber, MemPool_Index, Page_Attrib), where PageFrameNumber is the unique page identifier, or page index, MemPool_Index is the unique identifier of a memory pool, and Page_Attrib is a bit string to write to the page attribute bitmap. The Write_Page_Attributes( ) function may be called by an operating system process, for example, to write an entry in the per-page tracking table.

The Read_Page_Attributes( ) function takes the form Read_Page_Attributes (PageFrameNumber), where PageFrameNumber is the unique page identifier, or page index. The function returns a value representing the bitmap of the attributes. The value may be a binary value, a base-10 value, or some other representation depending on implementation. The Read_Page_Attributes( ) function may also return the memory pool index to which the page belongs, in an embodiment. The Read_Page_Attributes( ) function may be called by an operating system process, for example, to read an entry in the per-page tracking table.

The Lock_Page( ) function takes the form Lock_Page (PageFrameNumber), where PageFrameNumber is the unique page identifier, or page index. The function updates the per-page tracking table 310, changing the page attributes to "1" where the page index is equal to the PageFrameNumber. The function returns an indication of success or failure, depending on whether the processing circuitry 304 is able to write to the per-page tracking table 310 successfully.

The Unlock_Page( ) function takes the form Unlock_Page (PageFrameNumber), where PageFrameNumber is the unique page identifier, or page index. The function updates the per-page tracking table 310, changing the page attributes to "0" where the page index is equal to the PageFrameNumber. The function returns an indication of success or failure, depending on whether the processing circuitry 304 is able to write to the per-page tracking table 310 successfully.

Handling Low-Memory Conditions

The API functions described here are used to maintain the tables so that memory pool and page information may be accessed when the system moves to a low memory state. When the system is about to enter a low memory state, the hardware (e.g., processing circuitry 304) and operating system (e.g., software stack 306) interact to free enough memory to avoid system failure.

Figure 7:
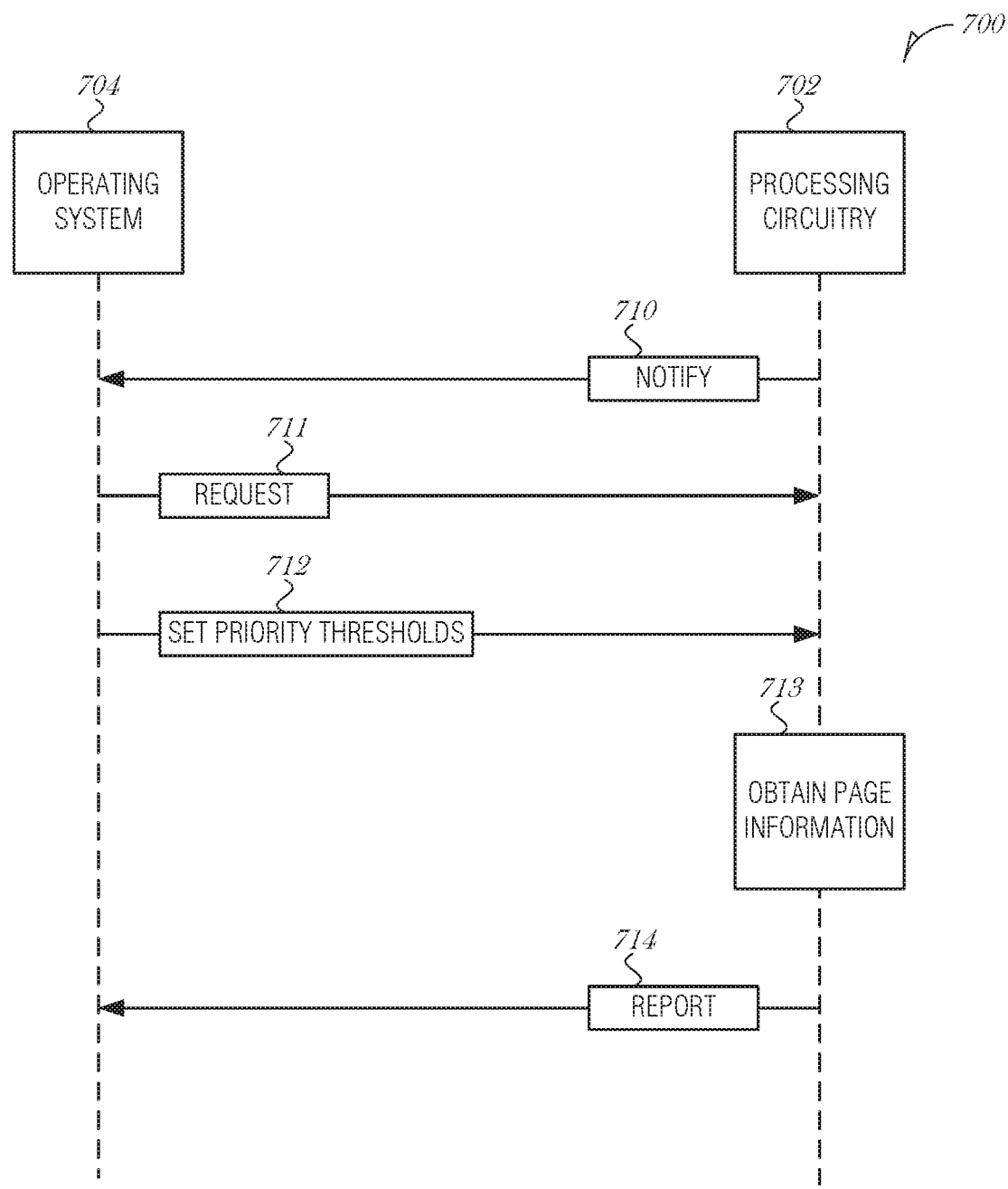
FIG. 7 is a swim lane diagram illustrating the interaction between hardware and software, according to an embodiment.

FIG. 7 is a swim lane diagram illustrating the interaction 700 between hardware and software, according to an embodiment. When the system is about to enter into the low memory state, processing circuitry 702 notifies the operating system 704. The notification may be based on a threshold amount of used memory (or free memory, depending on how the threshold is configured). The processing circuitry 702 is able to accurately determine the actual amount of memory used. This is obscured to the operating system 704 due to memory compression or memory deduplication techniques employed to increase available memory.

The processing circuitry 702 may use configurable interrupts that are triggered by a memory controller whenever consumption of the memory reaches a pre-defined level. The interrupts may be defined to be a message signal interrupt (MSI), a non-maskable interrupt (NMI), a corrected machine check interrupt (CMCI), or a machine check exception (MCE) to alert the processing circuitry 702. As an example, a memory controller may log the error in the MC bank with an appropriate MCA error code. MCEs may be permitted to go to a single target CPU (Local Machine Check) or may be broadcast to all CPUs in the system. Alternatively, the interrupts may be sent as a non-maskable interrupt (NMI) to communicate the severity of the pressure condition.

The processing circuitry 702 sends a notification message 710 to the operating system 704, to notify the operating system 704 of the existence of memory pressure. The operating system 704 may respond with a request 711 to provide the list of memory pools that pages from them may be relinquished to free up memory. This initial interaction between the processing circuitry 702 and the operating system 704 may be controlled using a prioritization scheme. In an embodiment, the operating system 704 may define two priority classes: "non-time critical priority" and "time critical priority". The priority classes are used to filter memory pools based on a minimum priority level during regular page reclamation and time-critical page reclamation.

To set the non-time critical priority value and the time critical priority value, the operating system 704 may utilize an API call. For instance the operating system 704 may use Set_MemPool_Min_Priority (Non_Time_Critical_Priority) and Set_MemPool_Min_Priority (Time_Critical_Priority) messages 712.

The processing circuitry 702 scans the per-page tracking table to generate a list of pages that may be swapped out. This scanning may be controlled by the priority levels set by messages 712. If the system does not use the priority levels set by messages 712, then the processing circuitry 702 may scan all pools and all pages in an ordered manner, such as by highest priority to lowest. An example embodiment is illustrated in FIG. 9 and the corresponding text.

Assuming that time critical priority levels are used via the messages 712, then in a non-time-critical condition, the processing circuitry 702 obtains memory pools to relinquish pages from by scanning each page in the per-page tracking table, determines whether the page is in a pool that meets the minimum priority (non-time-critical priority) and whether the page is locked. If the page is unlocked and the page is in a pool that meet the minimum priority, the processing circuitry 702 computes the amount of physical memory released if the page is swapped. The processing circuitry 702 maintains a running total of memory that may be recovered from all pages in each pool (operation 713). The processing circuitry 702 then reports the pool indices and the amount of memory that would be released if pages from those pools are swapped (message 714).

In a time-critical condition, the processing circuitry 702 may calculate memory recovery from fewer pools. For instance, if the non-time-critical priority threshold is 10, then memory pools with a priority value over 10 would be evaluated to identify pages that could be relinquished. A time-critical priority threshold may be higher, such as 12, so that only those memory pools with a higher possibility of having pages that, when released, would provide more freed memory are evaluated.

While the operations (operation 713) are illustrated in FIG. 7 as being performed in hardware, it is understood that most of the operations may be performed in software as well. The one operation that would have to be performed in hardware is the computation of the amount of physical memory that may be released by a particular page. This is because the memory controller, or other hardware components such as the memory reduction circuitry 212, are the only components that know the actual memory usage of a given memory page.

Figure 8:
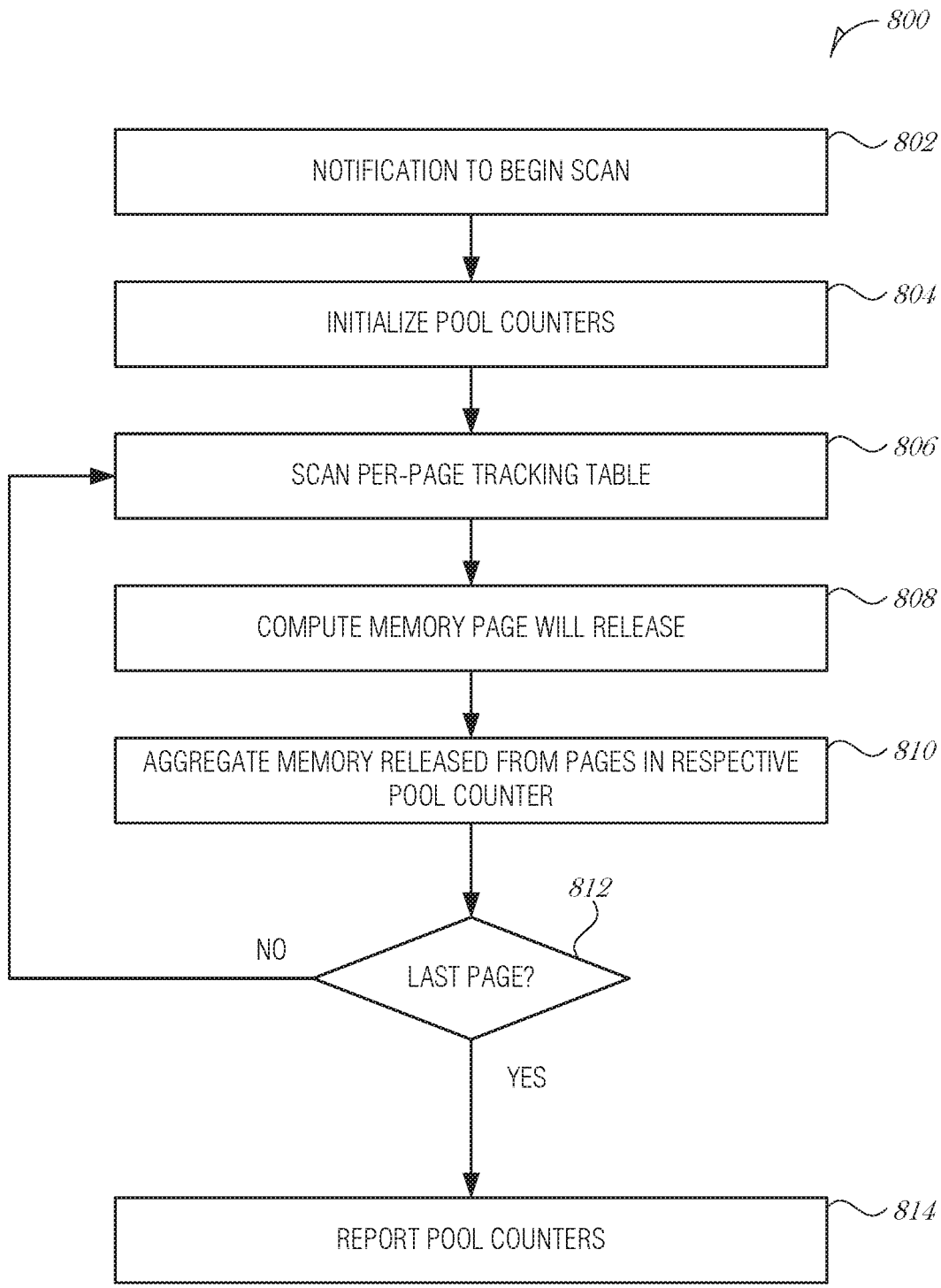
FIG. 8 is a flowchart illustrating a method for gathering compaction information for an operating system, according to an embodiment.

FIG. 8 is a flowchart illustrating a method 800 for gathering compaction or compression information for an operating system, according to an embodiment. The method 800 may be performed by the memory page control circuitry 210 of FIG. 2, for example. At 802, a notification to begin a scan is received by hardware, such as a memory controller, processing circuitry, or memory reduction circuitry. The notification may be transmitted from operating system software. Pool counters are initialized to zero (operation 804) and the per-page tracking table is scanned (operation 806). Pool counters may be maintained in main memory, a cache memory, a specific hardware register, or the like. Pool counters are used to maintain the amount of memory that may be reclaimed for each pool if the pages in the pool are swapped. Each per-page tracking table entry is evaluated. If the entry meets certain criteria, then the page is evaluated to determine the amount of memory the page will release if swapped (operation 808). The amount of memory potentially released from pages is aggregated in the respective pool counter (operation 810). The per-page table entry includes the memory pool index to identify a specific pool. If the method 800 has completed scanning the entire per-page tracking table (decision operation 812), then the pool counters are reported back to the requester (e.g., the operating system).

The report generated at operation 814 may be sorted. In an embodiment, the report is sorted based on the counter values from highest to lowest. This first pool identified in the report then is the one that would release the most memory upon swapping its pages. The operating system may then read from the top of the report and have the largest impact with the quickest response. Alternatively, the report may include all the pool indices along with the counter values to the operating system in the order they were found in the per-page tracking table. The operating system may then sort the table or otherwise decide which pool provides enough memory with its pages being swapped.

FIG. 9 is a pseudocode listing illustrating a process 900 to gather compaction/compression information, according to an embodiment. The process 900 may be performed by the memory page control circuitry 210 of FIG. 2, for example. The function Get_MemPool_to_Relinquish( ) is called with the pool priority threshold as a parameter. The pool priority threshold is set based on whether it is a time-critical situation. The maximum number of pools is determined using the Read_MemPool_EntrySize( ) function, which returns the maximum number of pools the hardware supports. An array of counter values is initialized to zero. The per-page tracking table is accessed and for each entry in the per-page tracking table, the pool index of the entry is determined. The pool index is used to look up the value of the pool from the memory pool table, using the Get_Pool_Priority( ) function.

If the pool priority is greater than the threshold priority, and the page is not locked, then the amount of memory released when a page is swapped is computed. The amount of memory is aggregated in the respective counter record. The counter array may be sorted. The counter array is then returned.

In an alternative embodiment, the memory pools to consider are provided by the calling entity (e.g., the operating system). For instance, the operating system may provide a list of memory pools to process to the Get_MemPool_to_Relinquish( ) function. In such an embodiment, instead of processing all of the pools that have a priority value of less than a threshold value, the function checks each entry in the per-page tracking table to determine if the memory pool related with the memory page is one that is to be evaluated based on the input list. When memory usage is low or otherwise non-critical, the operating system may provide a list of all or nearly all of the memory pools to evaluate. In this situation, the longer processing time is acceptable. However, when there is high memory pressure, the operating system may provide a shorter list of memory pools to evaluate, such as two or three. Here, the function to compute the amount of memory that may be released from any given page is skipped for a large number of pages due to the memory pool filter. It is understood that other mechanisms may be used to provide or determine the list of memory pools to evaluate.

Figure 10:
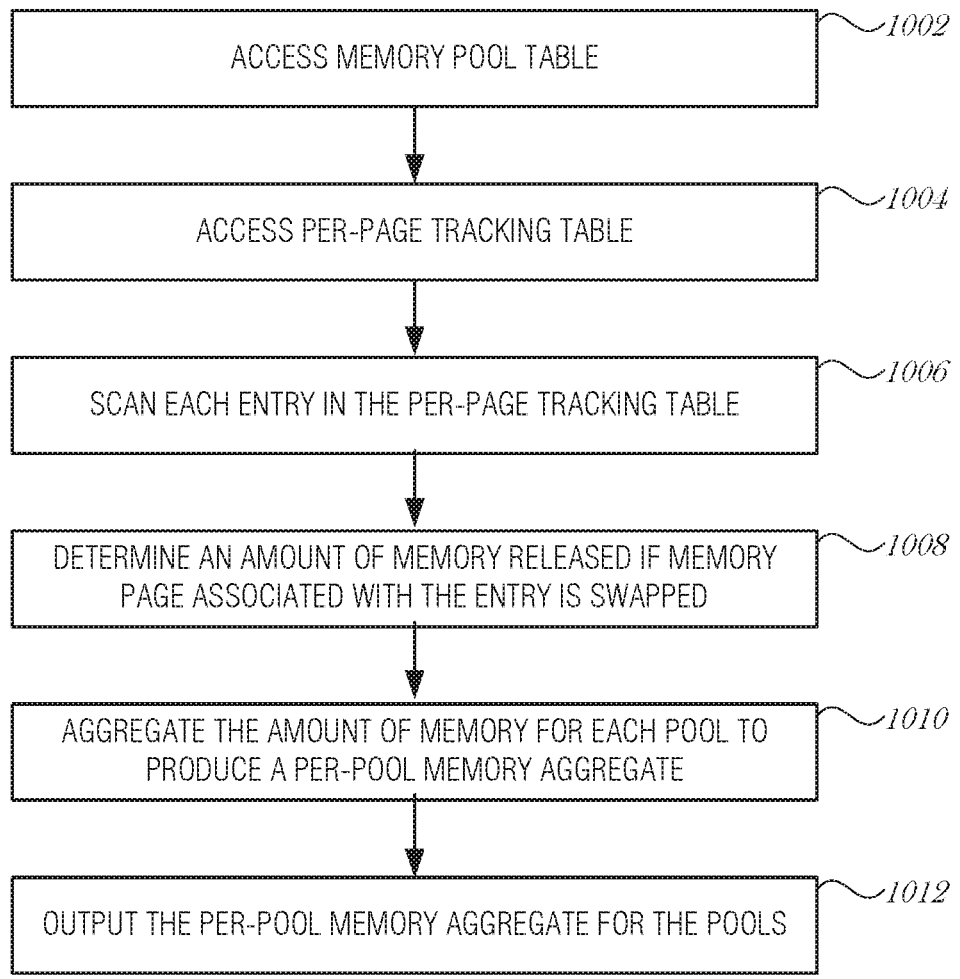
FIG. 10 is a flowchart illustrating a method for computer memory overcommitment management, according to an embodiment.
Figure 11:
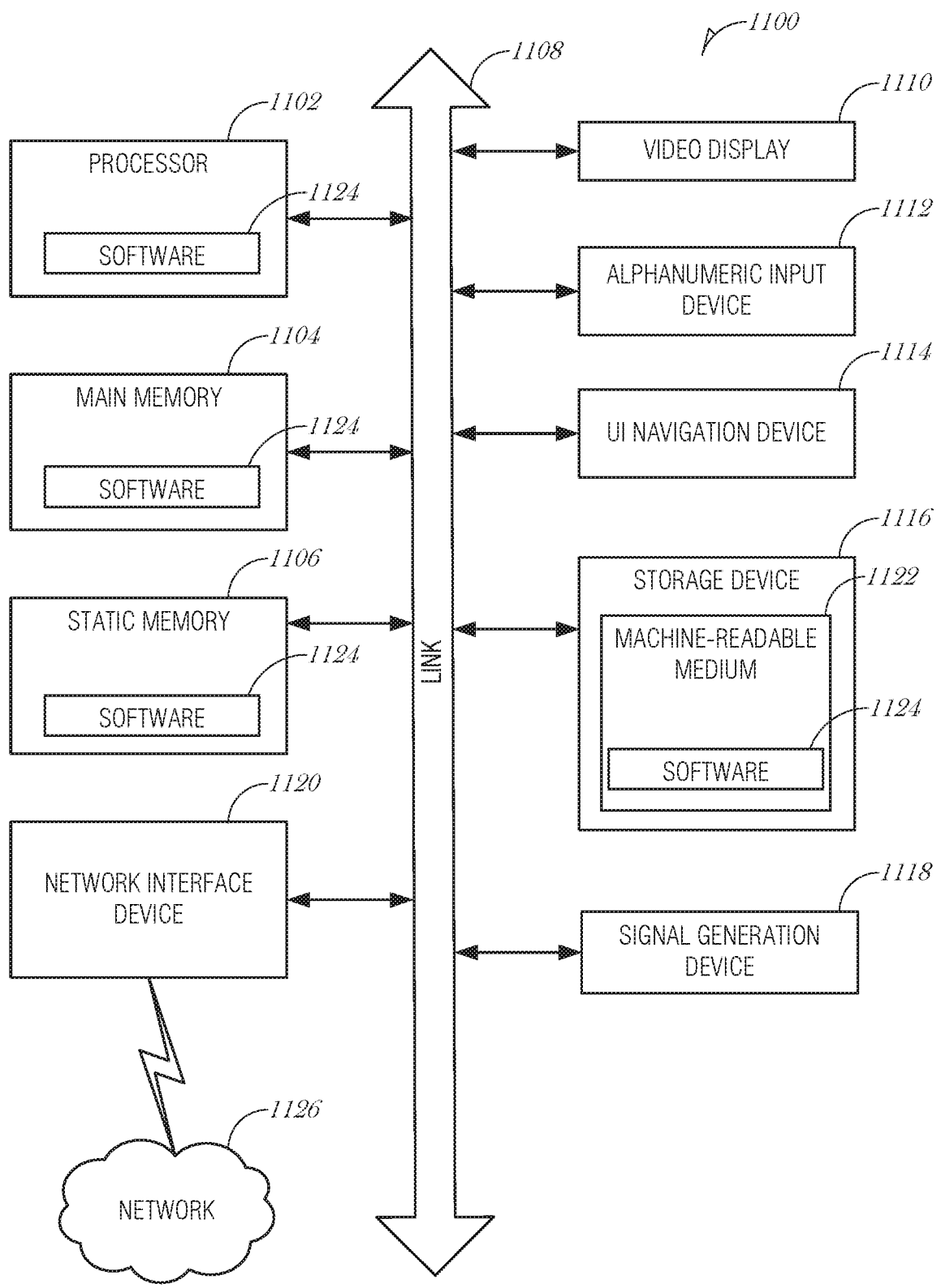
FIG. 11 is a block diagram illustrating an example machine upon which any one or more of the techniques (e.g., methodologies) discussed herein may perform, according to an embodiment.

FIG. 10 is a flowchart illustrating a method 1000 for computer memory management, according to an embodiment. The method 1000 may be performed by the memory page control circuitry 210 of FIG. 2, for example. At 1002, a memory pool table is accessed, where the memory pool table including entries that describe a plurality of memory pools, each memory pool representing a group of memory pages related by common attributes. In an embodiment, an entry in the memory pool table includes a memory pool index and pool attributes. In a further embodiment, the pool attributes is a bitmap used to define the pool attributes for the entry in the memory pool table. In a further embodiment, the pool attributes is a four-bit bitmap used to define whether a particular memory pool is a user pool or kernel pool, shared or not, standby or active, and paged or not paged.

At 1004, a per-page tracking table is accessed, where each entry in the per-page tracking table used to relate a memory page with a memory pool of the memory pool table. In an embodiment, the memory pages of the per-page tracking table are subject to a memory reduction technique. In a further embodiment, the memory reduction technique includes memory data compression. In a related embodiment, the memory reduction technique includes memory deduplication.

At 1006, each entry in the per-page tracking table is scanned and, for each entry: 1) an amount of memory released if the memory page related with the entry is swapped is determined (operation 1008) and 2) the amount of memory for the respective memory pool related with the memory page related with the entry in the per-page tracking table is aggregated, to produce a per-pool memory aggregate (operation 1010).

At 1012, after the per-page tracking table is scanned, the per-pool memory aggregate for the memory pools related with the memory pages in the per-page tracking table is output.

In an embodiment, the method 1000 includes sorting the per-pool memory aggregates for the memory pools from a highest value to a lowest value.

In an embodiment, an entry in the per-page tracking table includes a page index, a memory pool index, and page attributes. In a further embodiment, the page attributes define whether a particular memory page is locked or unlocked. In a related embodiment, scanning each entry in the per-page tracking table comprises: determining the entry indicates that the related page is locked and discontinuing further processing of the entry in response to the related page being locked.

In an embodiment, scanning each entry in the per-page tracking table comprises: determining the entry is related with a memory pool of interest and discontinuing further processing of the entry in response to the entry not being related with the memory pool of interest.

In a further embodiment, determining the entry is related with the memory pool of interest comprises evaluating a priority threshold against a memory pool priority. In a related embodiment, the memory pool priority is calculated from memory pool attributes stored in the memory pool table.

In another embodiment, determining the entry is related with the memory pool of interest comprises determining whether the memory pool related with the entry in the per-page tracking table is in a list of memory pools to process. In a further embodiment, the list of memory pools to process is provided from operating system software.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture.

FIG. 12 is a block diagram illustrating a machine in the example form of a computer system 1200, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a head-mounted display, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 1200 includes at least one processor 1202 (e.g., a central processing unit (CPU), a graphics processing unit (GPU) or both, processor cores, compute nodes, etc.), a main memory 1204 and a static memory 1206, which communicate with each other via a link 1208 (e.g., bus). The computer system 1200 may further include a video display unit 1210, an alphanumeric input device 1212 (e.g., a keyboard), and a user interface (UI) navigation device 1214 (e.g., a mouse). In one embodiment, the video display unit 1210, input device 1212 and UI navigation device 1214 are incorporated into a touch screen display. The computer system 1200 may additionally include a storage device 1216 (e.g., a drive unit), a signal generation device 1218 (e.g., a speaker), a network interface device 1220, and one or more sensors (not shown), such as a global positioning system (GPS) sensor, compass, accelerometer, gyrometer, magnetometer, or other sensor.

The storage device 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204, static memory 1206, and/or within the processor 1202 during execution thereof by the computer system 1200, with the main memory 1204, static memory 1206, and the processor 1202 also constituting machine-readable media.

While the machine-readable medium 1222 is illustrated in an example embodiment to be a single medium, the term "machine-readable medium" may include a single medium or multiple media (e.g., a centralized or distributed database, and/or associated caches and servers) that store the one or more instructions 1224. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1224 may further be transmitted or received over a communications network 1226 using a transmission medium via the network interface device 1220 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G. and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The figures below detail architectures and systems to implement embodiments of the above. In some embodiments, one or more hardware components and/or instructions described above are emulated as detailed below, or implemented as software modules.

Embodiments of the instruction(s) detailed above are embodied may be embodied in a "generic vector friendly instruction format" which is detailed below. In other embodiments, such a format is not utilized and another instruction format is used, however, the description below of the writemask registers, various data transformations (swizzle, broadcast, etc.), addressing, etc. is generally applicable to the description of the embodiments of the instruction(s) above. Additionally, systems, architectures, and pipelines are detailed below. Embodiments of the instruction(s) above may be executed on such systems, architectures, and pipelines, but are not limited to those detailed.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual. September 2014; and see Intel® Advanced Vector Extensions Programming Reference. October 2014).

Instruction Formats

Embodiments of the instruction(s) described herein may be embodied in different formats. Additionally, systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 12A:
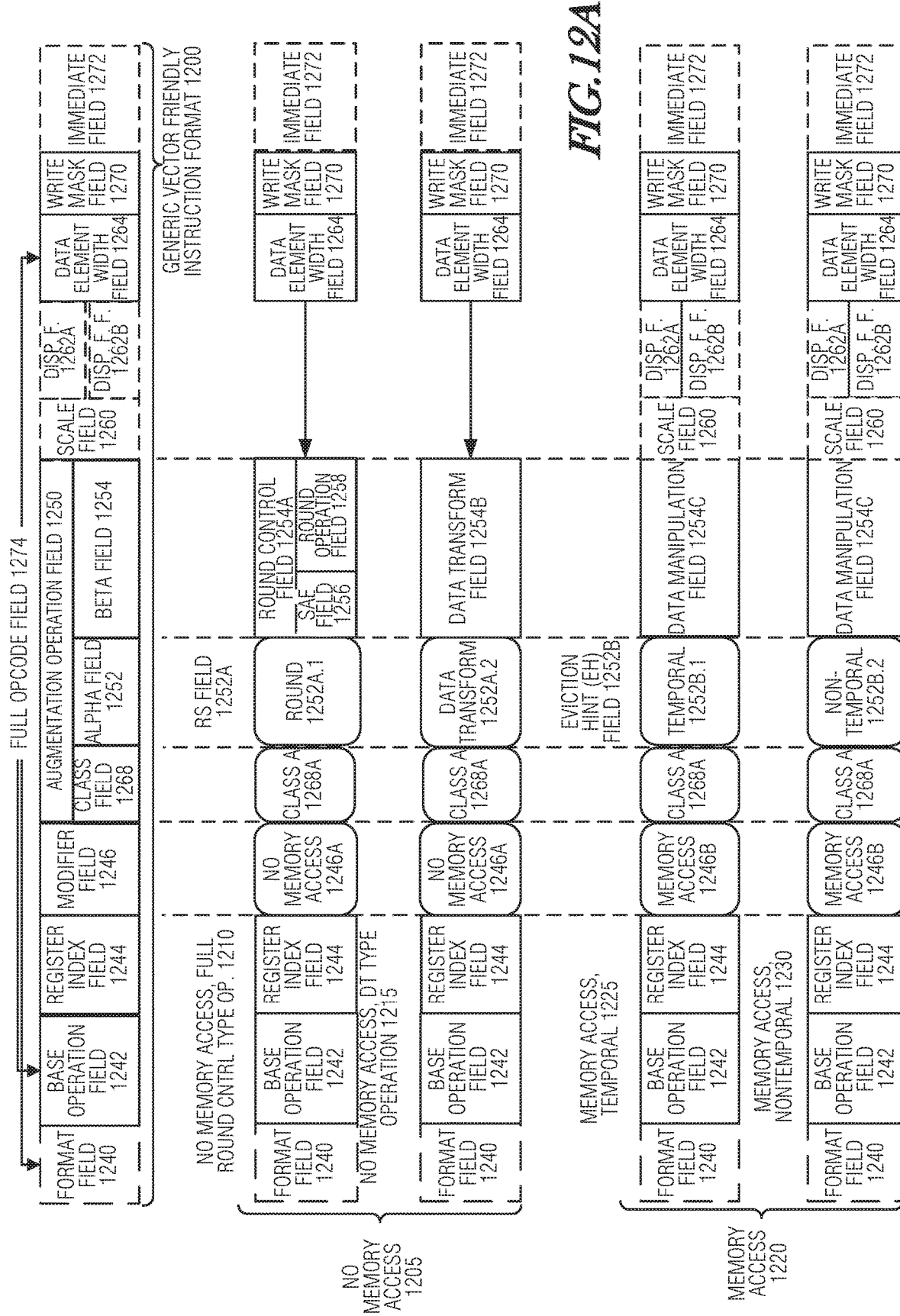

FIGS. 12A-12B are block diagrams illustrating a generic vector friendly instruction format and instruction templates thereof according to an embodiment. FIG. 12A is a block diagram illustrating a generic vector friendly instruction format and class A instruction templates thereof according to an embodiment: while FIG. 12B is a block diagram illustrating the generic vector friendly instruction format and class B instruction templates thereof according to an embodiment. Specifically, a generic vector friendly instruction format 1200 for which are defined class A and class B instruction templates, both of which include no memory access 1205 instruction templates and memory access 1220 instruction templates. The term generic in the context of the vector friendly instruction format refers to the instruction format not being tied to any specific instruction set.

While embodiments will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 12A include: 1) within the no memory access 1205 instruction templates there is shown a no memory access, full round control type operation 1210 instruction template and a no memory access, data transform type operation 1215 instruction template; and 2) within the memory access 1220 instruction templates there is shown a memory access, temporal 1225 instruction template and a memory access, non-temporal 1230 instruction template. The class B instruction templates in FIG. 12B include: 1) within the no memory access 1205 instruction templates there is shown a no memory access, write mask control partial round control type operation 1212 instruction template and a no memory access, write mask control, vsize type operation 1217 instruction template; and 2) within the memory access 1220 instruction templates there is shown a memory access, write mask control 1227 instruction template.

The generic vector friendly instruction format 1200 includes the following fields listed below in the order illustrated in FIGS. 12A-12B.

Format field 1240—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1242—its content distinguishes different base operations.

Register index field 1244—its content, directly or through address generation, specifies the locations of the source and destination operands, be they in registers or in memory. These include a sufficient number of bits to select N registers from a PxQ (e.g., 32×512, 16×128, 32×1024, 64×1024) register file. While in an embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1246—its content distinguishes occurrences of instructions in the generic vector instruction format that specify memory access from those that do not; that is, between no memory access 1205 instruction templates and memory access 1220 instruction templates. Memory access operations read and/or write to the memory hierarchy (in some cases specifying the source and/or destination addresses using values in registers), while non-memory access operations do not (e.g., the source and destinations are registers). While in an embodiment this field also selects between three different ways to perform memory address calculations, alternative embodiments may support more, less, or different ways to perform memory address calculations.

Augmentation operation field 1250—its content distinguishes which one of a variety of different operations to be performed in addition to the base operation. This field is context specific. In an embodiment, this field is divided into a class field 1268, an alpha field 1252, and a beta field 1254. The augmentation operation field 1250 allows common groups of operations to be performed in a single instruction rather than 2, 3, or 4 instructions.

Scale field 1260—its content allows for the scaling of the index field's content for memory address generation (e.g., for address generation that uses 2scale*index+base).

Displacement Field 1262A—its content is used as part of memory address generation (e.g., for address generation that uses 2scale*index+base+displacement).

Displacement Factor Field 1262B (note that the juxtaposition of displacement field 1262A directly over displacement factor field 1262B indicates one or the other is used)—its content is used as part of address generation; it specifies a displacement factor that is to be scaled by the size of a memory access (N)—where N is the number of bytes in the memory access (e.g., for address generation that uses 2scale*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1274 (described later herein) and the data manipulation field 1254C. The displacement field 1262A and the displacement factor field 1262B are optional in the sense that they are not used for the no memory access 1205 instruction templates and/or different embodiments may implement only one or none of the two.

Data element width field 1264—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1270—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation): in another embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in an embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1270 allows for partial vector operations, including loads, stores, arithmetic, logical, etc. While embodiments are described in which the write mask field's 1270 content selects one of a number of write mask registers that contains the write mask to be used (and thus the write mask field's 1270 content indirectly identifies that masking to be performed), alternative embodiments instead or additional allow the mask write field's 1270 content to directly specify the masking to be performed.

Immediate field 1272—its content allows for the specification of an immediate. This field is optional in the sense that is it not present in an implementation of the generic vector friendly format that does not support immediate and it is not present in instructions that do not use an immediate.

Class field 1268—its content distinguishes between different classes of instructions. With reference to FIGS. 12A-12B, the contents of this field select between class A and class B instructions. In FIGS. 12A-12B, rounded corner squares are used to indicate a specific value is present in a field (e.g., class A 1268A and class B 1268B for the class field 1268 respectively in FIGS. 12A-12B).

Instruction Templates of Class A

In the case of the non-memory access 1205 instruction templates of class A, the alpha field 1252 is interpreted as an RS field 1252A, whose content distinguishes which one of the different augmentation operation types are to be performed (e.g., round 1252A.1 and data transform 1252A.2 are respectively specified for the no memory access, round type operation 1210 and the no memory access, data transform type operation 1215 instruction templates), while the beta field 1254 distinguishes which of the operations of the specified type is to be performed. In the no memory access 1205 instruction templates, the scale field 1260, the displacement field 1262A, and the displacement scale filed 1262B are not present.

No-Memory Access Instruction Templates—Full Round Control Type Operation

In the no memory access full round control type operation 1210 instruction template, the beta field 1254 is interpreted as a round control field 1254A, whose content(s) provide static rounding. While in the described embodiments the round control field 1254A includes a suppress all floating point exceptions (SAE) field 1256 and a round operation control field 1258, alternative embodiments may support may encode both these concepts into the same field or only have one or the other of these concepts/fields (e.g., may have only the round operation control field 1258).

SAE field 1256—its content distinguishes whether or not to disable the exception event reporting; when the SAE field's 1256 content indicates suppression is enabled, a given instruction does not report any kind of floating-point exception flag and does not raise any floating point exception handler.

Round operation control field 1258—its content distinguishes which one of a group of rounding operations to perform (e.g., Round-up. Round-down, Round-towards-zero and Round-to-nearest). Thus, the round operation control field 1258 allows for the changing of the rounding mode on a per instruction basis. In an embodiment where a processor includes a control register for specifying rounding modes, the round operation control field's 1250 content overrides that register value.

No Memory Access Instruction Templates—Data Transform Type Operation

In the no memory access data transform type operation 1215 instruction template, the beta field 1254 is interpreted as a data transform field 1254B, whose content distinguishes which one of a number of data transforms is to be performed (e.g., no data transform, swizzle, broadcast).

In the case of a memory access 1220 instruction template of class A, the alpha field 1252 is interpreted as an eviction hint field 1252B, whose content distinguishes which one of the eviction hints is to be used (in FIG. 12A, temporal 1252B.1 and non-temporal 1252B.2 are respectively specified for the memory access, temporal 1225 instruction template and the memory access, non-temporal 1230 instruction template), while the beta field 1254 is interpreted as a data manipulation field 1254C, whose content distinguishes which one of a number of data manipulation operations (also known as primitives) is to be performed (e.g., no manipulation; broadcast; up conversion of a source; and down conversion of a destination). The memory access 1220 instruction templates include the scale field 1260, and optionally the displacement field 1262A or the displacement scale field 1262B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1252 is interpreted as a write mask control (Z) field 1252C, whose content distinguishes whether the write masking controlled by the write mask field 1270 should be a merging or a zeroing.

In the case of the non-memory access 1205 instruction templates of class B, part of the beta field 1254 is interpreted as an RL field 1257A, whose content distinguishes which one of the different augmentation operation types are to be performed (e.g., round 1257A.1 and vector length (VSIZE) 1257A.2 are respectively specified for the no memory access, write mask control, partial round control type operation 1212 instruction template and the no memory access, write mask control. VSIZE type operation 1217 instruction template), while the rest of the beta field 1254 distinguishes which of the operations of the specified type is to be performed. In the no memory access 1205 instruction templates, the scale field 1260, the displacement field 1262A, and the displacement scale filed 1262B are not present.

In the no memory access, write mask control partial round control type operation 1210 instruction template, the rest of the beta field 1254 is interpreted as a round operation field 1259A and exception event reporting is disabled (a given instruction does not report any kind of floating-point exception flag and does not raise any floating point exception handler).

Round operation control field 1259A—just as round operation control field 1258, its content distinguishes which one of a group of rounding operations to perform (e.g., Round-up, Round-down, Round-towards-zero and Round-to-nearest). Thus, the round operation control field 1259A allows for the changing of the rounding mode on a per instruction basis. In an embodiment where a processor includes a control register for specifying rounding modes, the round operation control field's 1250 content overrides that register value.

In the no memory access, write mask control, VSIZE type operation 1217 instruction template, the rest of the beta field 1254 is interpreted as a vector length field 1259B, whose content distinguishes which one of a number of data vector lengths is to be performed on (e.g., 128, 256, or 512 byte).

In the case of a memory access 1220 instruction template of class B, part of the beta field 1254 is interpreted as a broadcast field 1257B, whose content distinguishes whether or not the broadcast type data manipulation operation is to be performed, while the rest of the beta field 1254 is interpreted the vector length field 1259B. The memory access 1220 instruction templates include the scale field 1260, and optionally the displacement field 1262A or the displacement scale field 1262B.

With regard to the generic vector friendly instruction format 1200, a full opcode field 1274 is shown including the format field 1240, the base operation field 1242, and the data element width field 1264. While one embodiment is shown where the full opcode field 1274 includes all of these fields, the full opcode field 1274 includes less than all of these fields in embodiments that do not support all of them. The full opcode field 1274 provides the operation code (opcode).

The augmentation operation field 1250, the data element width field 1264, and the write mask field 1270 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A. and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Specific Vector Friendly Instruction Format

FIG. 13 is a block diagram illustrating a specific vector friendly instruction format according to an embodiment. FIG. 13 shows a specific vector friendly instruction format 1300 that is specific in the sense that it specifies the location, size, interpretation, and order of the fields, as well as values for some of those fields. The specific vector friendly instruction format 1300 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 12 into which the fields from FIG. 13 map are illustrated.

It should be understood that, although embodiments are described with reference to the specific vector friendly instruction format 1300 in the context of the generic vector friendly instruction format 1200 for illustrative purposes, the invention is not limited to the specific vector friendly instruction format 1300 except where claimed. For example, the generic vector friendly instruction format 1200 contemplates a variety of possible sizes for the various fields, while the specific vector friendly instruction format 1300 is shown as having fields of specific sizes. By way of specific example, while the data element width field 1264 is illustrated as a one bit field in the specific vector friendly instruction format 1300, the invention is not so limited (that is, the generic vector friendly instruction format 1200 contemplates other sizes of the data element width field 1264).

The generic vector friendly instruction format 1200 includes the following fields listed below in the order illustrated in FIG. 13A.

EVEX Prefix (Bytes 0-3) 1302—is encoded in a four-byte form.

Format Field 1240 (EVEX Byte 0, bits [7:0])—the first byte (EVEX Byte 0) is the format field 1240 and it contains 0x62 (the unique value used for distinguishing the vector friendly instruction format in an embodiment).

The second-fourth bytes (EVEX Bytes 1-3) include a number of bit fields providing specific capability.

REX field 1305 (EVEX Byte 1, bits [7-5])—consists of an EVEX.R bit field (EVEX Byte 1, bit [7]-R). EVEX.X bit field (EVEX byte 1, bit [6]-X), and 1257BEX byte 1, bit [5]-B). The EVEX.R. EVEX.X, and EVEX.B bit fields provide the same functionality as the corresponding VEX bit fields, and are encoded using Is complement form, i.e. ZMM0 is encoded as 1111B. ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1210—this is the first part of the REX' field 1210 and is the EVEX.R' bit field (EVEX Byte 1, bit [4]-R') that is used to encode either the upper 16 or lower 16 of the extended 32 register set. In an embodiment, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments do not store this and the other indicated bits below in the inverted format. A value of 1 is used to encode the lower 16 registers. In other words, R'Rrrr is formed by combining EVEX.R', EVEX.R. and the other RRR from other fields.

Opcode map field 1315 (EVEX byte 1, bits [3:0]-mmmm)—its content encodes an implied leading opcode byte (0F, 0F 38, or 0F 3).

Data element width field 1264 (EVEX byte 2, bit [7]-W)—is represented by the notation EVEX.W. EVEX.W is used to define the granularity (size) of the datatype (either 32-bit data elements or 64-bit data elements).

EVEX.vvvv 1320 (EVEX Byte 2, bits [6:3]-vvvv)—the role of EVEX.vvvv may include the following: 1) EVEX.vvvv encodes the first source register operand, specified in inverted (Is complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 1320 encodes the 4 low-order bits of the first source register specifier stored in inverted (1s complement) form. Depending on the instruction, an extra different EVEX bit field is used to extend the specifier size to 32 registers.

EVEX.U 1268 Class field (EVEX byte 2, bit [2]-U)—If EVEX.U=0, it indicates class A or EVEX.U0; if EVEX.U=1, it indicates class B or EVEX.U1.

Prefix encoding field 1325 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In an embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1252 (EVEX byte 3, bit [7]-EH: also known as EVEX.EH, EVEX.rs, EVEX.RL, EVEX.write mask control and EVEX.N; also illustrated with α)—as previously described, this field is context specific.

Beta field 1254 (EVEX byte 3, bits [6:4]-SSS, also known as EVEX.s2-0, EVEX.r2-0, EVEX.rr1, EVEX.LL0, EVEX.LLB; also illustrated with βββ)—as previously described, this field is context specific.

REX' field 1210—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1270 (EVEX byte 3, bits [2:0]-kkk)—its content specifies the index of a register in the write mask registers as previously described. In an embodiment, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1330 (Byte 4) is also known as the opcode byte. Part of the opcode is specified in this field.

MOD R/M Field 1340 (Byte 5) includes MOD field 1342, Reg field 1344, and R/M field 1346. As previously described, the MOD field's 1342 content distinguishes between memory access and non-memory access operations. The role of Reg field 1344 can be summarized to two situations: encoding either the destination register operand or a source register operand, or be treated as an opcode extension and not used to encode any instruction operand. The role of R/M field 1346 may include the following:

encoding the instruction operand that references a memory address, or encoding either the destination register operand or a source register operand.

Scale, Index, Base (SIB) Byte (Byte 6)—As previously described, the scale field's 1250 content is used for memory address generation. SIB.xxx 1354 and SIB.bbb 1356—the contents of these fields have been previously referred to with regard to the register indexes Xxxx and Bbbb.

Displacement field 1262A (Bytes 7-10)—when MOD field 1342 contains 10, bytes 7-10 are the displacement field 1262A, and it works the same as the legacy 32-bit displacement (disp32) and works at byte granularity.

Displacement factor field 1262B (Byte 7)—when MOD field 1342 contains 01, byte 7 is the displacement factor field 1262B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1262B is a reinterpretation of disp8; when using displacement factor field 1262B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1262B substitutes the legacy x86 instruction set 8-bit displacement. Thus, the displacement factor field 1262B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1272 operates as previously described.

Full Opcode Field

FIG. 13B is a block diagram illustrating the fields of the specific vector friendly instruction format 1300 that make up the full opcode field 1274 according to an embodiment. Specifically, the full opcode field 1274 includes the format field 1240, the base operation field 1242, and the data element width (W) field 1264. The base operation field 1242 includes the prefix encoding field 1325, the opcode map field 1315, and the real opcode field 1330.

Register Index Field

FIG. 13C is a block diagram illustrating the fields of the specific vector friendly instruction format 1300 that make up the register index field 1244 according to an embodiment. Specifically, the register index field 1244 includes the REX field 1305, the REX' field 1310, the MODR/M.reg field 1344, the MODR/M.r/m field 1346, the VVVV field 1320, xxx field 1354, and the bbb field 1356.

Augmentation Operation Field

Figure 13D:
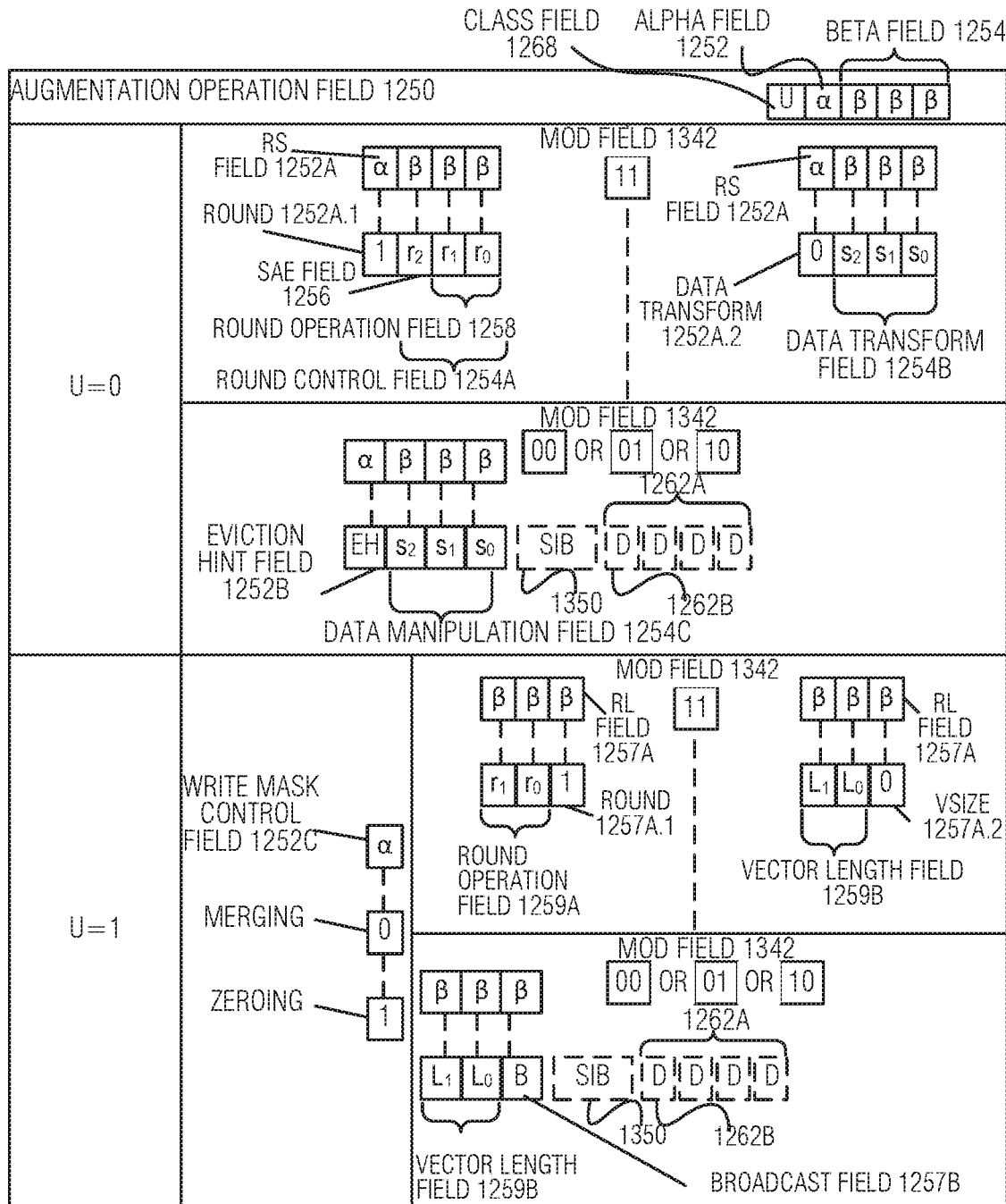

FIG. 13D is a block diagram illustrating the fields of the specific vector friendly instruction format 1300 that make up the augmentation operation field 1250 according to an embodiment. When the class (U) field 1268 contains 0, it signifies EVEX.U0 (class A 1268A): when it contains 1, it signifies EVEX.U1 (class B 1268B). When U=0 and the MOD field 1342 contains 11 (signifying a no memory access operation), the alpha field 1252 (EVEX byte 3, bit [7]-EH) is interpreted as the rs field 1252A. When the rs field 1252A contains a 1 (round 1252A.1), the beta field 1254 (EVEX byte 3, bits [6:4]-SSS) is interpreted as the round control field 1254A. The round control field 1254A includes a one bit SAE field 1256 and a two bit round operation field 1258. When the rs field 1252A contains a 0 (data transform 1252A.2), the beta field 1254 (EVEX byte 3, bits [6:4]-SSS) is interpreted as a three bit data transform field 1254B. When U=0 and the MOD field 1342 contains 00, 01, or 10 (signifying a memory access operation), the alpha field 1252 (EVEX byte 3, bit [7]-EH) is interpreted as the eviction hint (EH) field 1252B and the beta field 1254 (EVEX byte 3, bits [6:4]-SSS) is interpreted as a three bit data manipulation field 1254C.

When U=1, the alpha field 1252 (EVEX byte 3, bit [7]-EH) is interpreted as the write mask control (Z) field 1252C. When U=1 and the MOD field 1342 contains 11 (signifying a no memory access operation), part of the beta field 1254 (EVEX byte 3, bit [4]-S0) is interpreted as the RL field 1257A; when it contains a 1 (round 1257A.1) the rest of the beta field 1254 (EVEX byte 3, bit [6-5]-S2-1) is interpreted as the round operation field 1259A, while when the RL field 1257A contains a 0 (VSIZE 1257.A2) the rest of the beta field 1254 (EVEX byte 3, bit [6-5]-S2-1) is interpreted as the vector length field 1259B (EVEX byte 3, bit [6-5]-L1-0). When U=1 and the MOD field 1342 contains 00, 01, or 10 (signifying a memory access operation), the beta field 1254 (EVEX byte 3, bits [6:4]-SSS) is interpreted as the vector length field 1259B (EVEX byte 3, bit [6-5]-L1-0) and the broadcast field 1257B (EVEX byte 3, bit [4]-B).

Register Architecture

Figure 14:
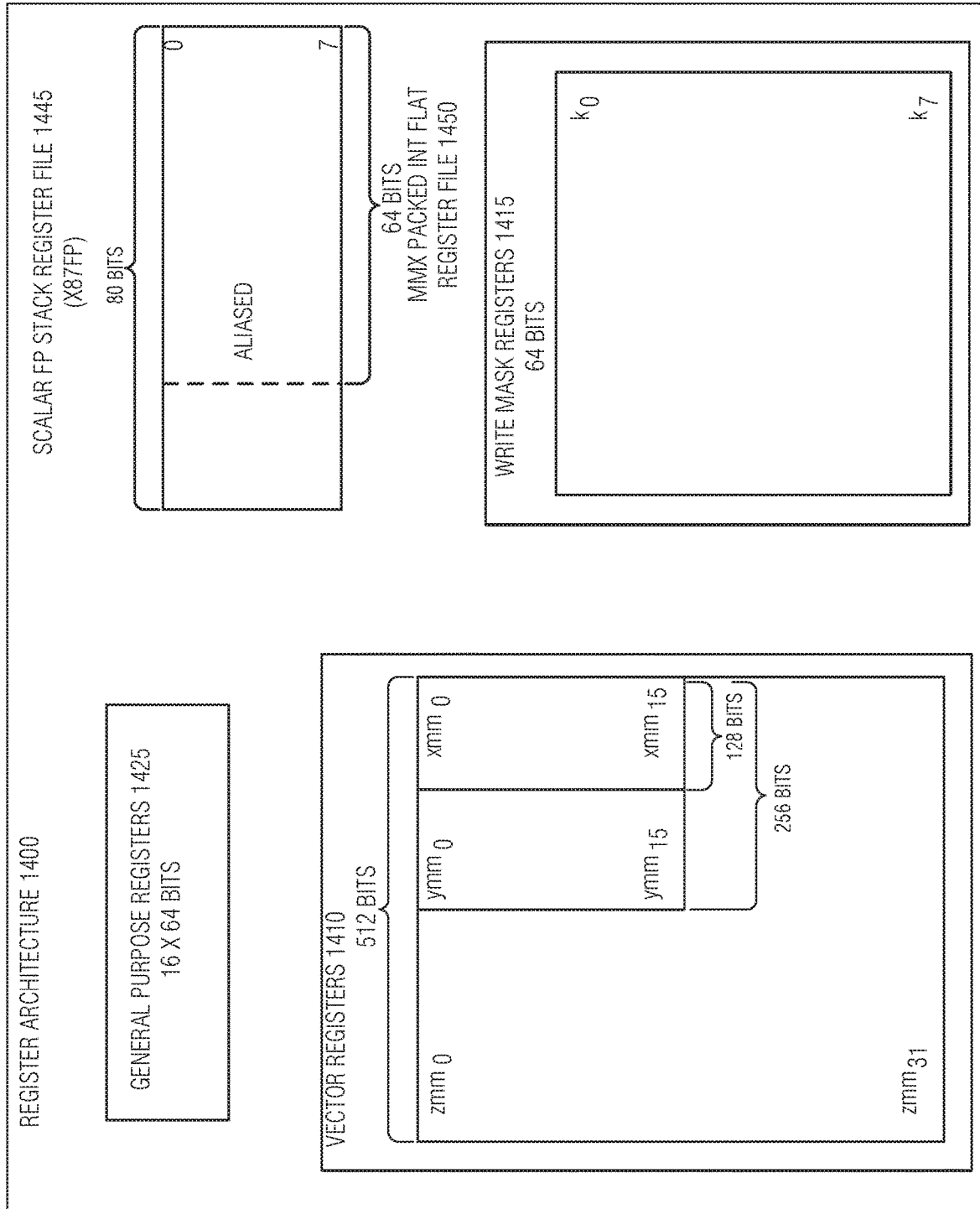
FIG. 14 is a block diagram of a register architecture according to an embodiment.

FIG. 14 is a block diagram of a register architecture 1400 according to an embodiment. In the embodiment illustrated, there are 32 vector registers 1410 that are 512 bits wide: these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1300 operates on these overlaid register file as illustrated in the below tables.

| Adjustable Vector Length | Class | Operations | Registers |
| --- | --- | --- | --- |
| Instruction Templates that do not include the vector length field 1259B | A (FIG. 12A; U = 0) | 1210, 1215, 1225, 1230 | zmm registers (the vector length is 64 byte) |
| | B (FIG. 12B; U = 1) | 1212 | zmm registers (the vector length is 64 byte) |
| Instruction templates that do include the vector length field 1259B | B (FIG. 12B; U = 1) | 1217, 1227 | zmm, ymm., or xmm registers (the vector length is 64 byte, 32 byte, or 16 byte) depending on the vector length field 1259B |

In other words, the vector length field 1259B selects between a maximum length and one or more other shorter lengths, where each such shorter length is half the length of the preceding length; and instructions templates without the vector length field 1259B operate on the maximum vector length. Further, in an embodiment, the class B instruction templates of the specific vector friendly instruction format 1300 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1415—in the embodiment illustrated, there are 8 write mask registers (k0 through k7), each 64 bits in size. In an alternate embodiment, the write mask registers 1415 are 16 bits in size. As previously described, in an embodiment, the vector mask register k0 cannot be used as a write mask; when the encoding that would normally indicate k0 is used for a write mask, it selects a hardwired write mask of 0xFFFF, effectively disabling write masking for that instruction.

General-purpose registers 1425—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1445, on which is aliased the MMX packed integer flat register file 1450—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments may use wider or narrower registers. Additionally, alternative embodiments may use more, less, or different register files and registers.

Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing.

Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Core architectures are described next, followed by descriptions of processors and computer architectures.

Core Architectures

In-Order and Out-of-Order Core Block Diagram

FIG. 15A is a block diagram illustrating both an in-order pipeline and a register renaming, out-of-order issue/execution pipeline according to embodiments. FIG. 15B is a block diagram illustrating both an embodiment of an in-order architecture core and a register renaming, out-of-order issue/execution architecture core to be included in a processor according to an embodiment. The solid lined boxes in FIGS. 15A-15B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 15A, a processor pipeline 1500 includes a fetch stage 1502, a length decode stage 1504, a decode stage 1506, an allocation stage 1508, a renaming stage 1510, a scheduling (also known as a dispatch or issue) stage 1512, a register read/memory read stage 1514, an execute stage 1516, a write back/memory write stage 1518, an exception handling stage 1522, and a commit stage 1524.

FIG. 15B shows processor core 1590 including a front end unit 1530 coupled to an execution engine unit 1550, and both are coupled to a memory unit 1570. The core 1590 may be a reduced instruction set computing (RISC) core, a complex instruction set computing (CISC) core, a very long instruction word (VLIW) core, or a hybrid or alternative core type. As yet another option, the core 1590 may be a special-purpose core, such as, for example, a network or communication core, compression engine, coprocessor core, general purpose computing graphics processing unit (GPGPU) core, graphics core, or the like.

The front end unit 1530 includes a branch prediction unit 1532 coupled to an instruction cache unit 1534, which is coupled to an instruction translation lookaside buffer (TLB) 1536, which is coupled to an instruction fetch unit 1538, which is coupled to a decode unit 1540. The decode unit 1540 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1540 may be implemented using various different mechanisms. Examples of suitable mechanisms include, but are not limited to, look-up tables, hardware implementations, programmable logic arrays (PLAs), microcode read only memories (ROMs), etc. In an embodiment, the core 1590 includes a microcode ROM or other medium that stores microcode for certain macroinstructions (e.g., in decode unit 1540 or otherwise within the front end unit 1530). The decode unit 1540 is coupled to a rename/allocator unit 1552 in the execution engine unit 1550.

The execution engine unit 1550 includes the rename/allocator unit 1552 coupled to a retirement unit 1554 and a set of one or more scheduler unit(s) 1556. The scheduler unit(s) 1556 represents any number of different schedulers, including reservations stations, central instruction window, etc. The scheduler unit(s) 1556 is coupled to the physical register file(s) unit(s) 1558. Each of the physical register file(s) units 1558 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In an embodiment, the physical register file(s) unit 1558 comprises a vector registers unit, a write mask registers unit, and a scalar registers unit. These register units may provide architectural vector registers, vector mask registers, and general purpose registers. The physical register file(s) unit(s) 1558 is overlapped by the retirement unit 1554 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1554 and the physical register file(s) unit(s) 1558 are coupled to the execution cluster(s) 1560. The execution cluster(s) 1560 includes a set of one or more execution units 1562 and a set of one or more memory access units 1564. The execution units 1562 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1556, physical register file(s) unit(s) 1558, and execution cluster(s) 1560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1564). It should also be understood that where separate pipelines are used, one or more of these pipelines may be out-of-order issue/execution and the rest in-order.

The set of memory access units 1564 is coupled to the memory unit 1570, which includes a data TLB unit 1572 coupled to a data cache unit 1574 coupled to a level 2 (L2) cache unit 1576. In an embodiment, the memory access units 1564 may include a load unit, a store address unit, and a store data unit, each of which is coupled to the data TLB unit 1572 in the memory unit 1570. The instruction cache unit 1534 is further coupled to a level 2 (L2) cache unit 1576 in the memory unit 1570. The L2 cache unit 1576 is coupled to one or more other levels of cache and eventually to a main memory.

By way of example, the register renaming, out-of-order issue/execution core architecture may implement the pipeline 1500 as follows: 1) the instruction fetch 1538 performs the fetch and length decoding stages 1502 and 1504; 2) the decode unit 1540 performs the decode stage 1506; 3) the rename/allocator unit 1552 performs the allocation stage 1508 and renaming stage 1510; 4) the scheduler unit(s) 1556 performs the schedule stage 1512; 5) the physical register file(s) unit(s) 1558 and the memory unit 1570 perform the register read/memory read stage 1514: the execution cluster 1560 perform the execute stage 1516; 6) the memory unit 1570 and the physical register file(s) unit(s) 1558 perform the write back/memory write stage 1518; 7) various units may be involved in the exception handling stage 1522; and 8) the retirement unit 1554 and the physical register file(s) unit(s) 1558 perform the commit stage 1524.

The core 1590 may support one or more instructions sets (e.g., the x86 instruction set (with some extensions that have been added with newer versions): the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In an embodiment, the core 1590 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1534/1574 and a shared L2 cache unit 1576, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific In-Order Core Architecture

Figure 16B:
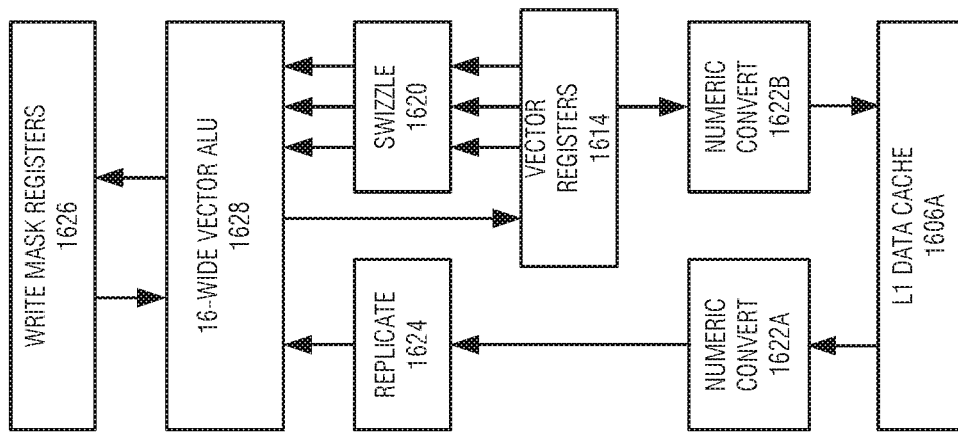
FIGS. 16A-16B illustrate block diagrams of a more specific in-order core architecture, which core would be one of several logic blocks (including other cores of the same type and/or different types) in a chip, according to an embodiment.
Figure 16A:
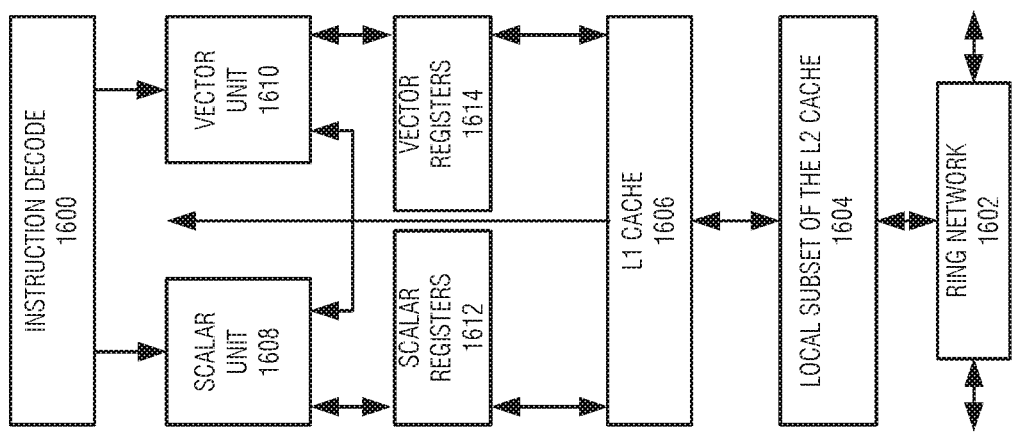

FIGS. 16A-16B illustrate a block diagram of a more specific in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 16A is a block diagram of a single processor core, along with its connection to the on-die interconnect network 1602 and with its local subset of the Level 2 (L2) cache 1604, according to an embodiment. In an embodiment, an instruction decoder 1600 supports the x86 instruction set with a packed data instruction set extension. An L1 cache 1606 allows low-latency accesses to cache memory into the scalar and vector units. While in one embodiment (to simplify the design), a scalar unit 1608 and a vector unit 1610 use separate register sets (respectively, scalar registers 1612 and vector registers 1614) and data transferred between them is written to memory and then read back in from a level 1 (L1) cache 1606, alternative embodiments may use a different approach (e.g., use a single register set or include a communication path that allow data to be transferred between the two register files without being written and read back).

The local subset of the L2 cache 1604 is part of a global L2 cache that is divided into separate local subsets, one per processor core. Each processor core has a direct access path to its own local subset of the L2 cache 1604. Data read by a processor core is stored in its L2 cache subset 1604 and can be accessed quickly, in parallel with other processor cores accessing their own local L2 cache subsets. Data written by a processor core is stored in its own L2 cache subset 1604 and is flushed from other subsets, if necessary. The ring network ensures coherency for shared data. The ring network is bi-directional to allow agents such as processor cores. L2 caches and other logic blocks to communicate with each other within the chip. Each ring data-path is 1012-bits wide per direction.

FIG. 16B is an expanded view of part of the processor core in FIG. 16A according to an embodiment. FIG. 16B includes an L1 data cache 1606A part of the L1 cache 1604, as well as more detail regarding the vector unit 1610 and the vector registers 1614. Specifically, the vector unit 1610 is a 16-wide vector processing unit (VPU) (see the 16-wide ALU 1628), which executes one or more of integer, single-precision float, and double-precision float instructions. The VPU supports swizzling the register inputs with swizzle unit 1620, numeric conversion with numeric convert units 1622A-B. and replication with replication unit 1624 on the memory input. Write mask registers 1626 allow predicating resulting vector writes.

Figure 17:
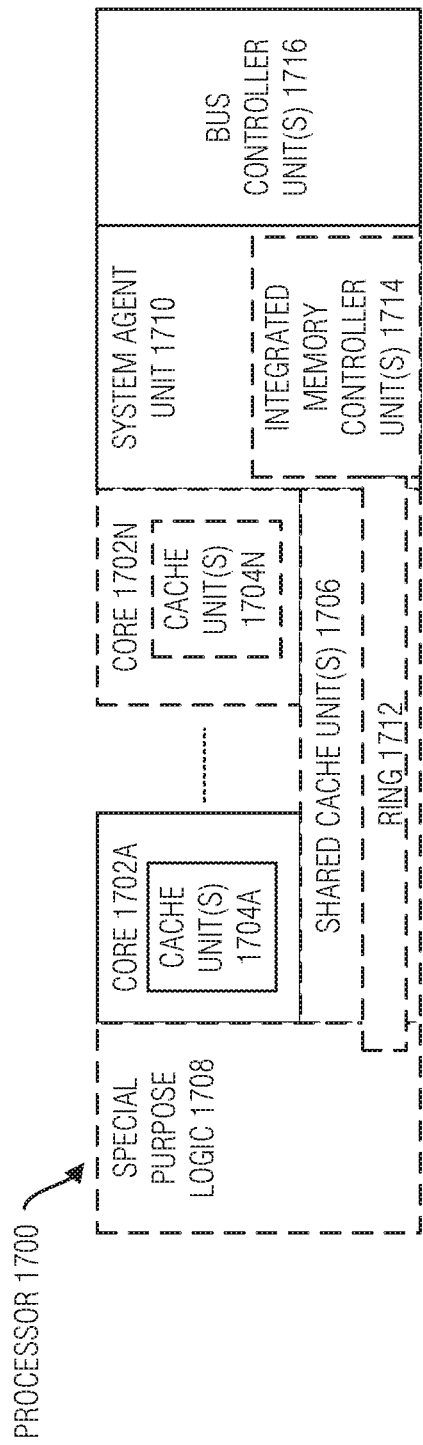
FIG. 17 is a block diagram of a processor that may have more than one core, may have an integrated memory controller, and may have integrated graphics according to an embodiment.

FIG. 17 is a block diagram of a processor 1700 that may have more than one core, may have an integrated memory controller, and may have integrated graphics according to embodiments. The solid lined boxes in FIG. 17 illustrate a processor 1700 with a single core 1702A, a system agent 1710, a set of one or more bus controller units 1716, while the optional addition of the dashed lined boxes illustrates an alternative processor 1700 with multiple cores 1702A-N, a set of one or more integrated memory controller unit(s) 1714 in the system agent unit 1710, and special purpose logic 1708.

Thus, different implementations of the processor 1700 may include: 1) a CPU with the special purpose logic 1708 being integrated graphics and/or scientific (throughput) logic (which may include one or more cores), and the cores 1702A-N being one or more general purpose cores (e.g., general purpose in-order cores, general purpose out-of-order cores, a combination of the two); 2) a coprocessor with the cores 1702A-N being a large number of special purpose cores intended primarily for graphics and/or scientific (throughput); and 3) a coprocessor with the cores 1702A-N being a large number of general purpose in-order cores. Thus, the processor 1700 may be a general-purpose processor, coprocessor or special-purpose processor, such as, for example, a network or communication processor, compression engine, graphics processor. GPGPU (general purpose graphics processing unit), a high-throughput many integrated core (MIC) coprocessor (including 30 or more cores), embedded processor, or the like. The processor may be implemented on one or more chips. The processor 1700 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1706, and external memory (not shown) coupled to the set of integrated memory controller units 1714. The set of shared cache units 1706 may include one or more mid-level caches, such as level 2 (L2), level 3 (L3), level 4 (L4), or other levels of cache, a last level cache (LLC), and/or combinations thereof. While in one embodiment a ring based interconnect unit 1712 interconnects the integrated graphics logic 1708, the set of shared cache units 1706, and the system agent unit 1710/integrated memory controller unit(s) 1714, alternative embodiments may use any number of well-known techniques for interconnecting such units. In an embodiment, coherency is maintained between one or more cache units 1704A-N and cores 1702A-N.

In some embodiments, one or more of the cores 1702A-N are capable of multi-threading. The system agent 1710 includes those components coordinating and operating cores 1702A-N. The system agent unit 1710 may include for example a power control unit (PCU) and a display unit. The PCU may be or include logic and components needed for regulating the power state of the cores 1702A-N and the integrated graphics logic 1708. The display unit is for driving one or more externally connected displays.

The cores 1702A-N may be homogenous or heterogeneous in terms of architecture instruction set; that is, two or more of the cores 1702A-N may be capable of execution the same instruction set, while others may be capable of executing only a subset of that instruction set or a different instruction set.

Computer Architectures

FIGS. 18-21 are block diagrams of computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 18:
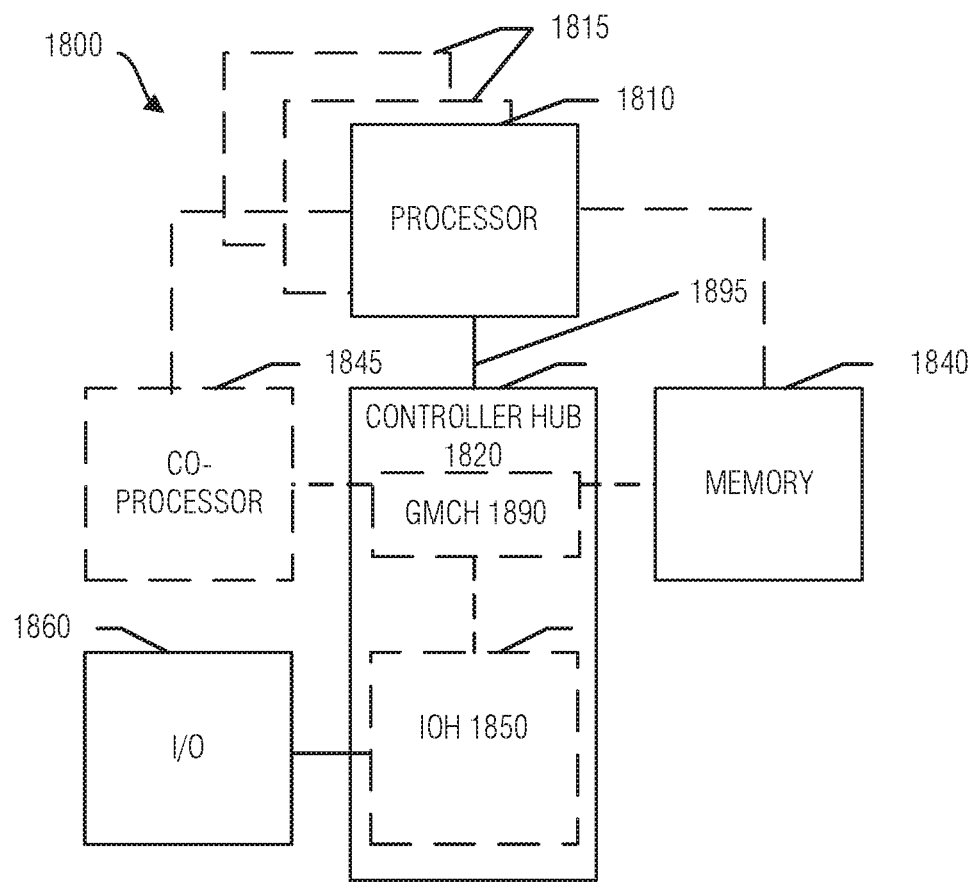
FIGS. 18-21 are block diagrams of computer architectures, according to an embodiment.

Referring now to FIG. 18, shown is a block diagram of a system 1800 according to an embodiment. The system 1800 may include one or more processors 1810, 1815, which are coupled to a controller hub 1820. In an embodiment the controller hub 1820 includes a graphics memory controller hub (GMCH) 1890 and an Input/Output Hub (IOH) 1850 (which may be on separate chips): the GMCH 1890 includes memory and graphics controllers to which are coupled memory 1840 and a coprocessor 1845; the IOH 1850 is couples input/output (I/O) devices 1860 to the GMCH 1890. Alternatively, one or both of the memory and graphics controllers are integrated within the processor (as described herein), the memory 1840 and the coprocessor 1845 are coupled directly to the processor 1810, and the controller hub 1820 in a single chip with the IOH 1850.

The optional nature of additional processors 1815 is denoted in FIG. 18 with broken lines. Each processor 1810, 1815 may include one or more of the processing cores described herein and may be some version of the processor 1700.

The memory 1840 may be, for example, dynamic random access memory (DRAM), phase change memory (PCM), or a combination of the two. For at least one embodiment, the controller hub 1820 communicates with the processor(s) 1810, 1815 via a multi-drop bus, such as a frontside bus (FSB), point-to-point interface such as QuickPath Interconnect (QPI), or similar connection 1895.

In an embodiment, the coprocessor 1845 is a special-purpose processor, such as, for example, a high-throughput MIC processor, a network or communication processor, compression engine, graphics processor. GPGPU, embedded processor, or the like. In an embodiment, controller hub 1820 may include an integrated graphics accelerator.

There can be a variety of differences between the physical resources 1810, 1815 in terms of a spectrum of metrics of merit including architectural, microarchitectural, thermal, power consumption characteristics, and the like.

In an embodiment, the processor 1810 executes instructions that control data processing operations of a general type. Embedded within the instructions may be coprocessor instructions. The processor 1810 recognizes these coprocessor instructions as being of a type that should be executed by the attached coprocessor 1845. Accordingly, the processor 1810 issues these coprocessor instructions (or control signals representing coprocessor instructions) on a coprocessor bus or other interconnect, to coprocessor 1845. Coprocessor(s) 1845 accept and execute the received coprocessor instructions.

Figure 19:
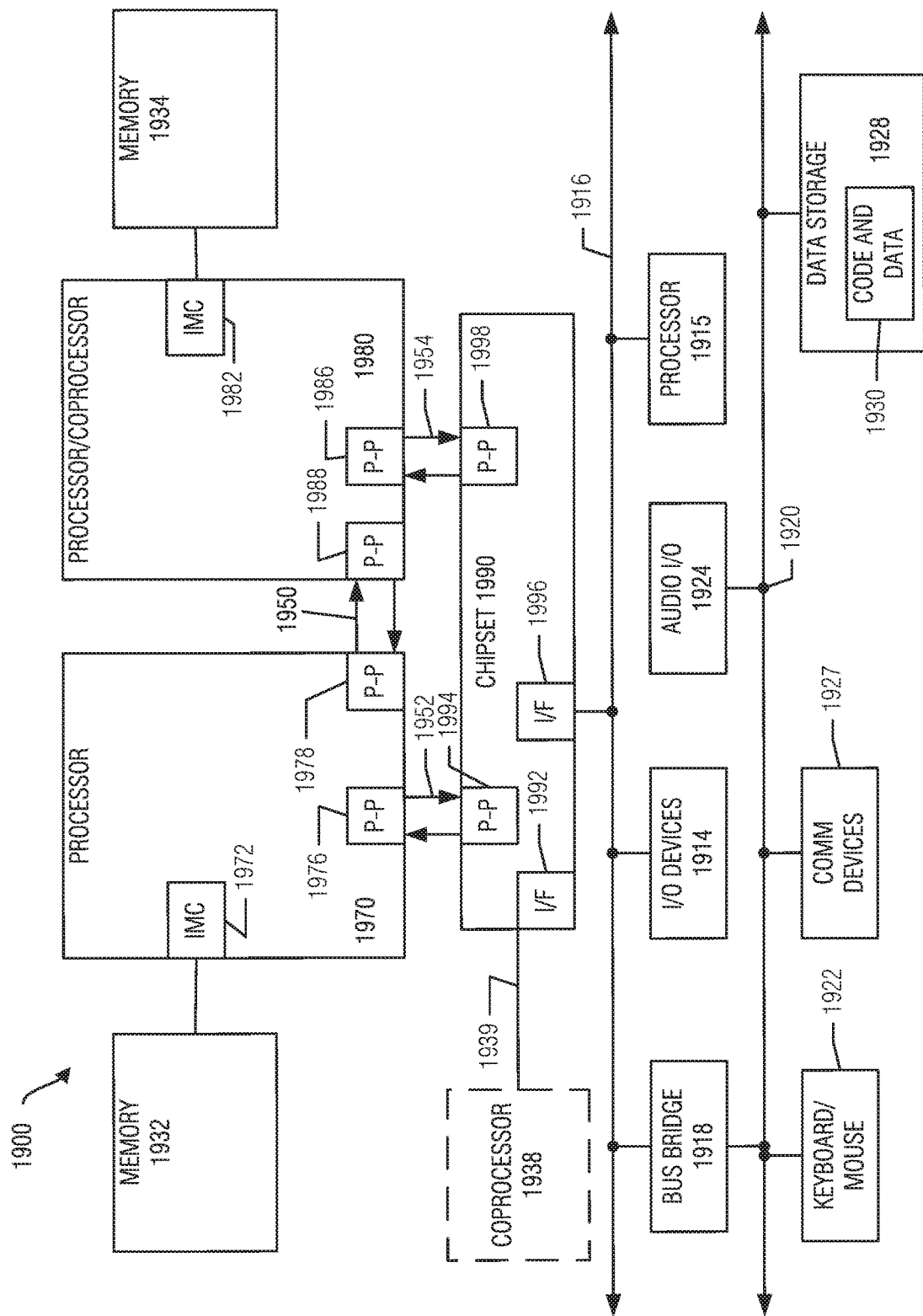

Referring now to FIG. 19, shown is a block diagram of a first more specific system 1900 in accordance with an embodiment. As shown in FIG. 19, multiprocessor system 1900 is a point-to-point interconnect system, and includes a first processor 1970 and a second processor 1980 coupled via a point-to-point interconnect 1950. Each of processors 1970 and 1980 may be some version of the processor 1700. In an embodiment, processors 1970 and 1980 are respectively processors 1810 and 1815, while coprocessor 1938 is coprocessor 1845. In another embodiment, processors 1970 and 1980 are respectively processor 1810 coprocessor 1845.

Processors 1970 and 1980 are shown including integrated memory controller (IMC) units 1972 and 1982, respectively. Processor 1970 also includes as part of its bus controller units point-to-point (P-P) interfaces 1976 and 1978; similarly, second processor 1980 includes P-P interfaces 1986 and 1988. Processors 1970, 1980 may exchange information via a point-to-point (P-P) interface 1950 using P-P interface circuits 1978, 1988. As shown in FIG. 19. IMCs 1972 and 1982 couple the processors to respective memories, namely a memory 1932 and a memory 1934, which may be portions of main memory locally attached to the respective processors.

Processors 1970, 1980 may each exchange information with a chipset 1990 via individual P-P interfaces 1952, 1954 using point to point interface circuits 1976, 1994, 1986, 1998. Chipset 1990 may optionally exchange information with the coprocessor 1938 via a high-performance interface 1939. In an embodiment, the coprocessor 1938 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1990 may be coupled to a first bus 1916 via an interface 1996. In an embodiment, first bus 1916 may be a Peripheral Component Interconnect (PCI) bus, or a bus such as a PCI Express bus or another third generation I/O interconnect bus, although the scope of the present invention is not so limited.

As shown in FIG. 19, various I/O devices 1914 may be coupled to first bus 1916, along with a bus bridge 1918 which couples first bus 1916 to a second bus 1920. In an embodiment, one or more additional processor(s) 1915, such as coprocessors, high-throughput MIC processors. GPGPU's, accelerators (such as e.g., graphics accelerators or digital signal processing (DSP) units), field programmable gate arrays, or any other processor, are coupled to first bus 1916. In an embodiment, second bus 1920 may be a low pin count (LPC) bus. Various devices may be coupled to a second bus 1920 including, for example, a keyboard and/or mouse 1922, communication devices 1927 and a storage unit 1928 such as a disk drive or other mass storage device which may include instructions/code and data 1930, in an embodiment. Further, an audio I/O 1924 may be coupled to the second bus 1920. Note that other architectures are possible. For example, instead of the point-to-point architecture of FIG. 19, a system may implement a multi-drop bus or other such architecture.

Figure 20:
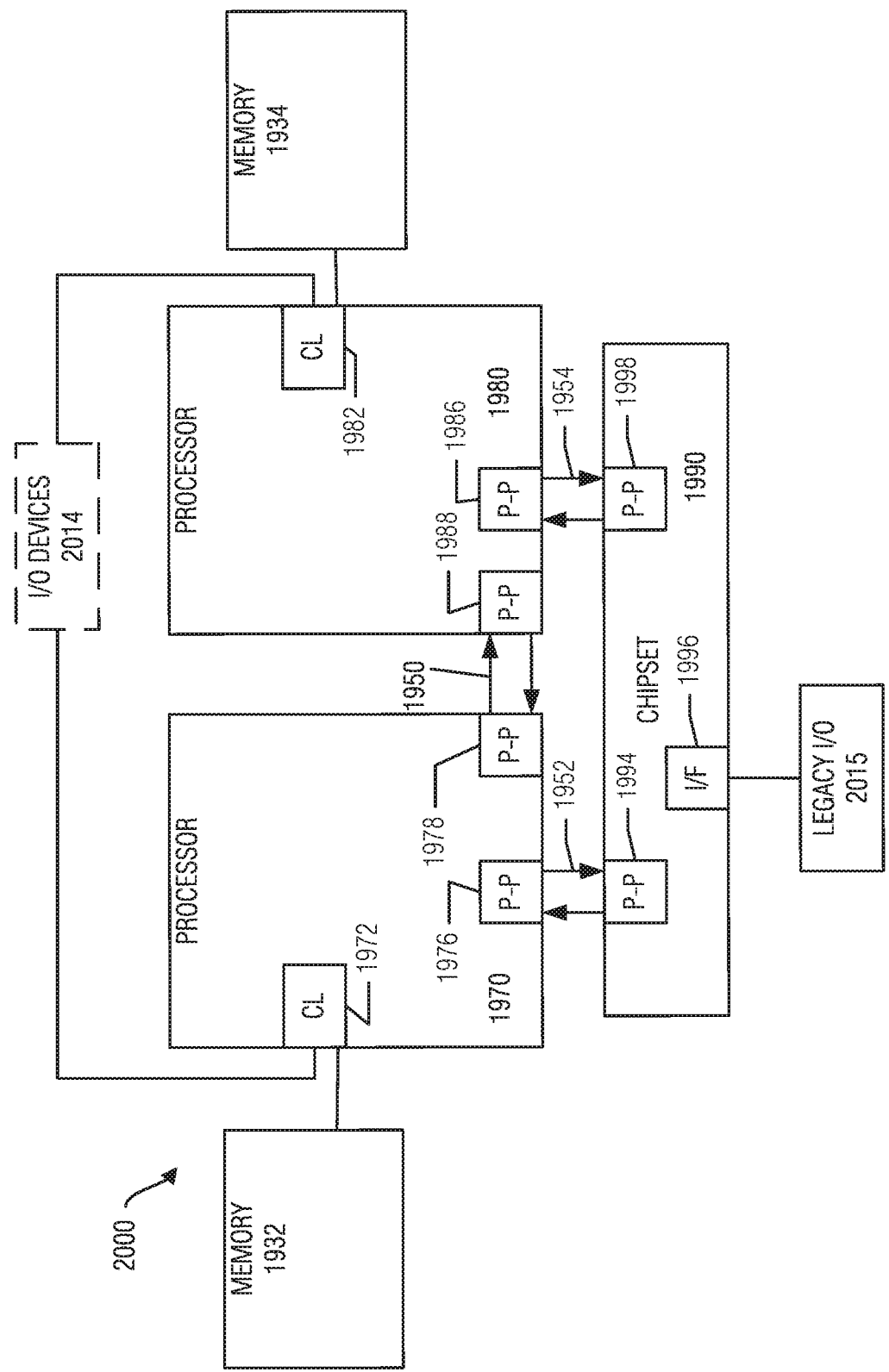

Referring now to FIG. 20, shown is a block diagram of a second more specific system 2000 in accordance with an embodiment. Like elements in FIGS. 19 and 20 bear like reference numerals, and certain aspects of FIG. 19 have been omitted from FIG. 20 in order to avoid obscuring other aspects of FIG. 20.

FIG. 20 illustrates that the processors 1970, 1980 may include integrated memory and I/O control logic ("CL") 1972 and 1982, respectively. Thus, the CL 1972, 1982 include integrated memory controller units and include I/O control logic. FIG. 20 illustrates that not only are the memories 1932, 1934 coupled to the CL 1972, 1982, but also that I/O devices 2014 are also coupled to the control logic 1972, 1982. Legacy I/O devices 2015 are coupled to the chipset 1990.

Figure 21:
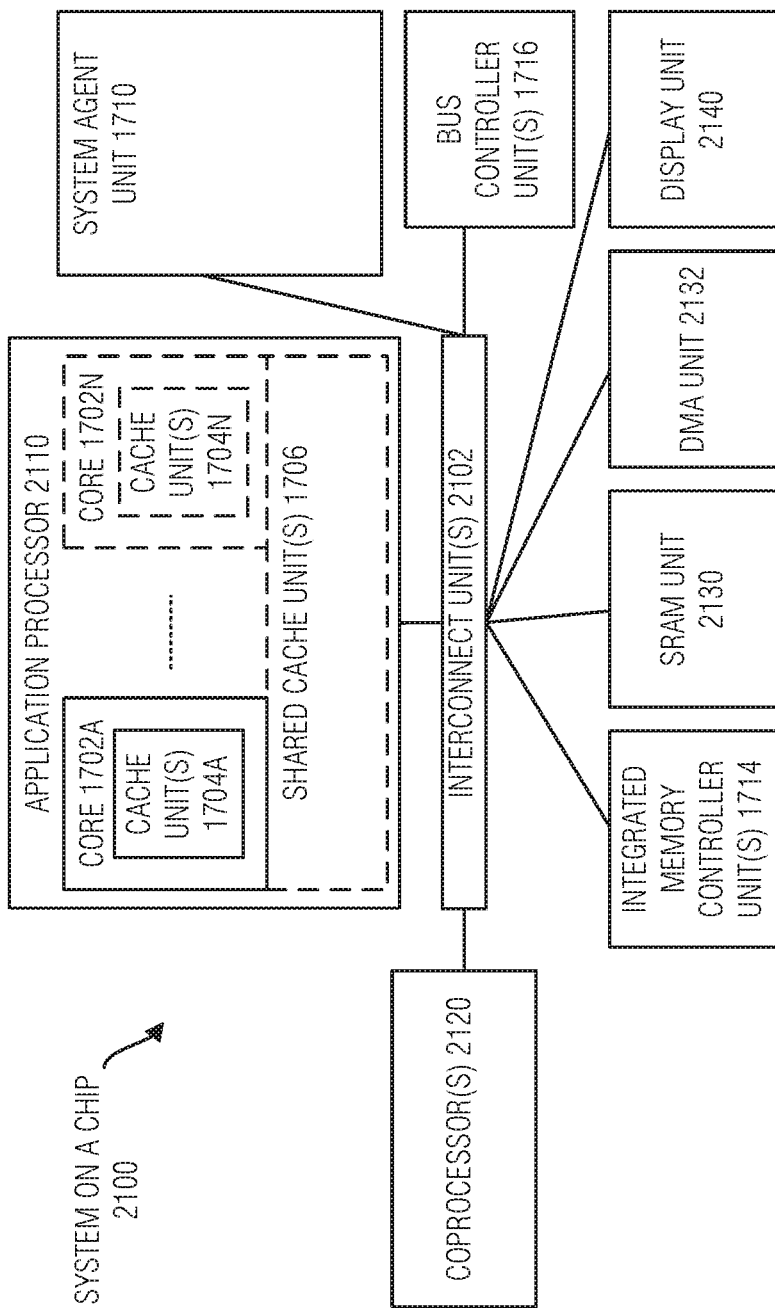

Referring now to FIG. 21, shown is a block diagram of a SoC 2100 in accordance with an embodiment. Similar elements in FIG. 17 bear like reference numerals. Also, dashed lined boxes are optional features on more advanced SoCs. In FIG. 21, an interconnect unit(s) 2102 is coupled to: an application processor 2110 which includes a set of one or more cores 1702A-N with integrated cache units 1704A-N and shared cache unit(s) 1706; a system agent unit 1710: a bus controller unit(s) 1716: an integrated memory controller unit(s) 1714; a set or one or more coprocessors 2120 which may include integrated graphics logic, an image processor, an audio processor, and a video processor; an static random access memory (SRAM) unit 2130: a direct memory access (DMA) unit 2132; and a display unit 2140 for coupling to one or more external displays. In an embodiment, the coprocessor(s) 2120 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1930 illustrated in FIG. 19, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 22:
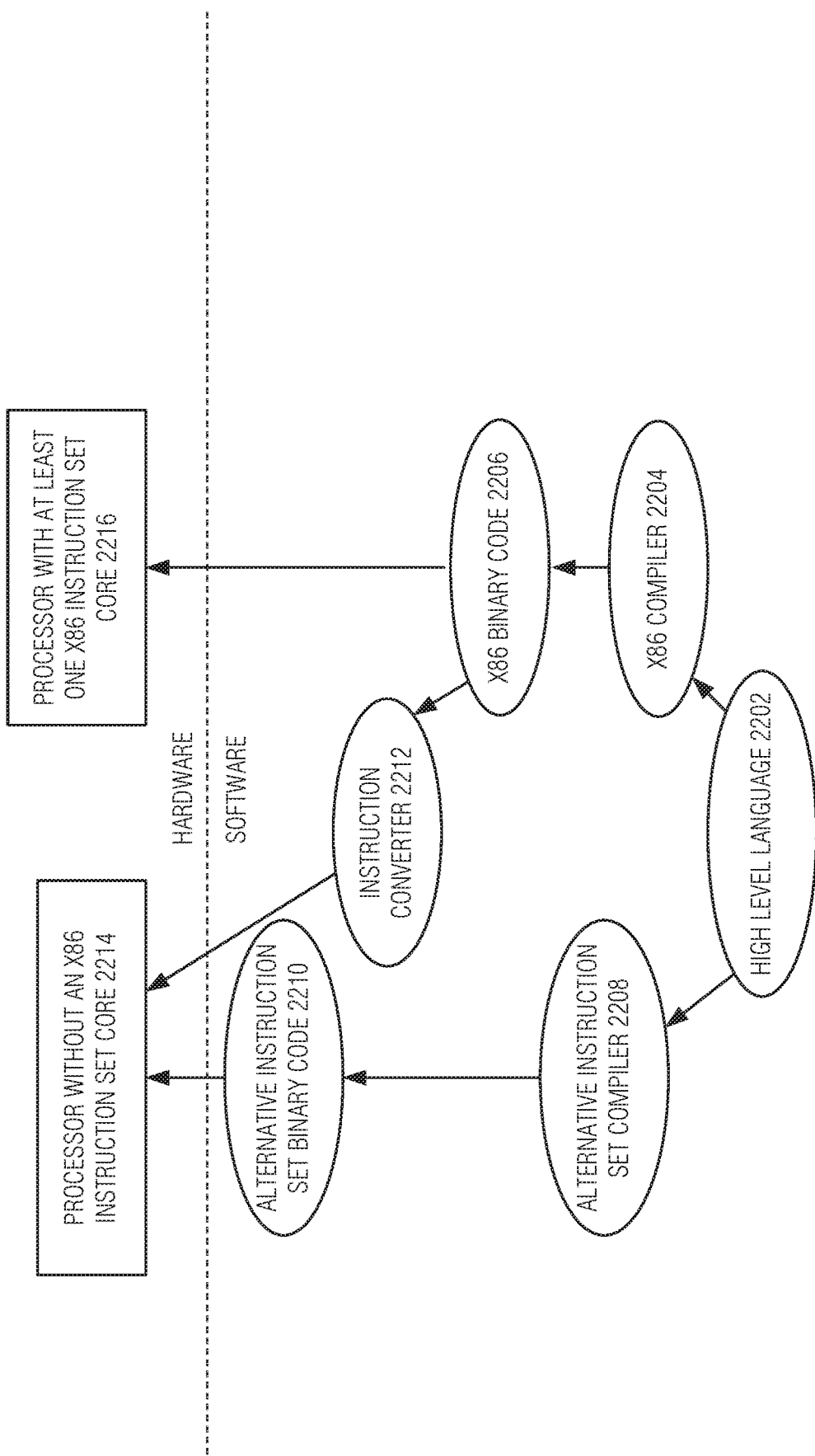
FIG. 22 is a block diagram contrasting the use of a software instruction converter to convert binary instructions in a source instruction set to binary instructions in a target instruction set according to an embodiment.

FIG. 22 is a block diagram contrasting the use of a software instruction converter to convert binary instructions in a source instruction set to binary instructions in a target instruction set according to embodiments. In the illustrated embodiment, the instruction converter is a software instruction converter, although alternatively the instruction converter may be implemented in software, firmware, hardware, or various combinations thereof. FIG. 22 shows a program in a high level language 2202 may be compiled using an x86 compiler 2204 to generate x86 binary code 2206 that may be natively executed by a processor with at least one x86 instruction set core 2216. The processor with at least one x86 instruction set core 2216 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2204 represents a compiler that is operable to generate x86 binary code 2206 (e.g., object code) that can, with or without additional linkage processing, be executed on the processor with at least one x86 instruction set core 2216. Similarly, FIG. 22 shows the program in the high level language 2202 may be compiled using an alternative instruction set compiler 2208 to generate alternative instruction set binary code 2210 that may be natively executed by a processor without at least one x86 instruction set core 2214 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2212 is used to convert the x86 binary code 2206 into code that may be natively executed by the processor without an x86 instruction set core 2214. This converted code is not likely to be the same as the alternative instruction set binary code 2210 because an instruction converter capable of this is difficult to make; however, the converted code will accomplish the general operation and be made up of instructions from the alternative instruction set. Thus, the instruction converter 2212 represents software, firmware, hardware, or a combination thereof that, through emulation, simulation or any other process, allows a processor or other electronic device that does not have an x86 instruction set processor or core to execute the x86 binary code 2206.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for computer memory management, the system comprising:
a first memory device to store a memory pool table, the memory pool table including entries that describe a plurality of memory pools, each memory pool representing a group of memory pages related by common attributes;
a second memory device to store a per-page tracking table, each entry in the per-page tracking table to relate a memory page with a memory pool of the memory pool table; and
processing circuitry to:
scan each entry in the per-page tracking table and, for each entry:
determine an amount of memory released if the memory page related with the entry is swapped; and
aggregate the amount of memory for the respective memory pool related with the memory page related with the entry in the per-page tracking table, to produce a per-pool memory aggregate; and
output the per-pool memory aggregate for the memory pools related with the memory pages in the per-page tracking table.

2. The system of claim 1, wherein the memory pages of the per-page tracking table are subject to a memory reduction technique.

3. The system of claim 2, wherein the memory reduction technique includes memory data compression.

4. The system of claim 2, wherein the memory reduction technique includes memory deduplication.

5. The system of claim 1, wherein the processing circuitry is further to:
sort the per-pool memory aggregates for the memory pools from a highest value to a lowest value.

6. The system of claim 1, wherein an entry in the memory pool table is to include a memory pool index and pool attributes.

7. The system of claim 6, wherein the pool attributes is a bitmap used to define the pool attributes of the entry in the memory pool table.

8. The system of claim 7, wherein the pool attributes is a four-bit bitmap used to define whether a particular memory pool is a user pool or kernel pool, shared or not, standby or active, and paged or not paged.

9. The system of claim 1, wherein an entry in the per-page tracking table is to include a page index, a memory pool index, and page attributes.

10. The system of claim 9, wherein the page attributes define whether a particular memory page is locked or unlocked.

11. The system of claim 10, wherein, to scan each entry in the per-page tracking table, the processing circuitry is to:
determine the entry indicates that the related page is locked, and
discontinue further processing of the entry in response to the related page being locked.

12. The system of claim 1, wherein to scan each entry in the per-page tracking table, the processing circuitry is to:
determine the entry is related with a memory pool of interest; and
discontinue further processing of the entry in response to the entry not being related with the memory pool of interest.

13. The system of claim 12, wherein to determine the entry is related with the memory pool of interest, the processing circuitry is to evaluate a priority threshold against a memory pool priority.

14. The system of claim 13, wherein the memory pool priority is calculated from memory pool attributes stored in the memory pool table.

15. The system of claim 12, wherein, to determine the entry is related with the memory pool of interest, the processing circuitry is to determine whether the memory pool related with the entry in the per-page tracking table is in a list of memory pools to process.

16. The system of claim 15, wherein the list of memory pools to process is provided to the processing circuitry from operating system software.

17. A method of computer memory management, the method comprising:
accessing a memory pool table, the memory pool table including entries that describe a plurality of memory pools, each memory pool representing a group of memory pages related by common attributes;
accessing a per-page tracking table, each entry in the per-page tracking table used to related a memory page with a memory pool of the memory pool table; and
scanning each entry in the per-page tracking table and, for each entry:
determining an amount of memory released if the memory page related with the entry is swapped; and
aggregating the amount of memory for the respective memory pool related with the memory page related with the entry in the per-page tracking table, to produce a per-pool memory aggregate; and
outputting the per-pool memory aggregate for the memory pools related with the memory pages in the per-page tracking table.

18. The method of claim 17, wherein scanning each entry in the per-page tracking table comprises:
determining the entry is related with a memory pool of interest; and
discontinuing further processing of the entry in response to the entry not being related with the memory pool of interest.

19. The method of claim 18, wherein determining the entry is related with the memory pool of interest comprises evaluating a priority threshold against a memory pool priority.

20. The method of claim 19, wherein the memory pool priority is calculated from memory pool attributes stored in the memory pool table.

* * * * *

UNITED STATES PATENT AND TRADEMARK OFFICE
CERTIFICATE OF CORRECTION

PATENT NO. : 10,733,108 B2
APPLICATION NO. : 15/980523
DATED : August 4, 2020
INVENTOR(S) : Bahirji et al.

Page 1 of 1

It is certified that error appears in the above-identified patent and that said Letters Patent is hereby corrected as shown below:

In the Claims

In Column 38, Line 4, in Claim 11, delete "locked," and insert --locked;-- therefor Signed and Sealed this
Twelfth Day of January, 2021

Andrei Iancu
*Director of the United States Patent and Trademark Office*